United States Patent
Ito et al.

(10) Patent No.: US 11,399,134 B2
(45) Date of Patent: Jul. 26, 2022

(54) IMAGE PROCESSING APPARATUS, IMAGING APPARATUS, AND IMAGE PROCESSING METHOD

(71) Applicant: SONY CORPORATION, Tokyo (JP)

(72) Inventors: Atsushi Ito, Kanagawa (JP); Ilya Reshetouski, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/978,616

(22) PCT Filed: Jan. 29, 2019

(86) PCT No.: PCT/JP2019/003031
§ 371 (c)(1),
(2) Date: Sep. 4, 2020

(87) PCT Pub. No.: WO2019/176349
PCT Pub. Date: Sep. 19, 2019

(65) Prior Publication Data
US 2021/0044746 A1 Feb. 11, 2021

(30) Foreign Application Priority Data
Mar. 14, 2018 (JP) .............................. JP2018-046496

(51) Int. Cl.
*H04N 5/232* (2006.01)
*G06T 5/00* (2006.01)
(Continued)

(52) U.S. Cl.
CPC ......... *H04N 5/23229* (2013.01); *G06T 5/004* (2013.01); *G06T 5/50* (2013.01); *H04N 5/2254* (2013.01)

(58) Field of Classification Search
None
See application file for complete search history.

(56) References Cited

U.S. PATENT DOCUMENTS

| | | |
|---|---|---|
| 2006/0157640 A1 | 7/2006 | Perlman et al. |
| 2009/0095912 A1 | 4/2009 | Slinger et al. |
| | (Continued) | |

FOREIGN PATENT DOCUMENTS

| | | |
|---|---|---|
| CA | 2608377 A | 11/2006 |
| CN | 101228460 A | 7/2008 |
| | (Continued) | |

OTHER PUBLICATIONS

Boominathan, et al., "Lensless Imaging: A computational renaissance", IEEE, Signal Processing Magazine, vol. 33, No. 5, XP011621850, Sep. 2016, pp. 23-35.

(Continued)

*Primary Examiner* — James M Hannett
(74) *Attorney, Agent, or Firm* — Chip Law Group

(57) ABSTRACT

A configuration is realized that can execute image processing reflecting data unique to camera, such as positional relation information between a mask and an image sensor of a lensless camera, to generate a highly accurate restored image. A signal processing unit that receives a photographed image as an output of the image sensor of the lensless camera to generate a restored image is included, and the signal processing unit executes image processing using data unique to camera generated based on at least the positional relation information of the mask and the image sensor of the lensless camera to generate the restored image. The data unique to camera is data generated in a comparison process of a photographed image, which is obtained by photographing one point light source in a forward direction of an optical axis of the lensless camera, and a reference image. The reference image is a simulation image estimated to be acquired in a case where a positional relation between the mask and the image sensor indicates reference positions.

18 Claims, 16 Drawing Sheets

(51) Int. Cl.
*G06T 5/50* (2006.01)
*H04N 5/225* (2006.01)

(56) References Cited

U.S. PATENT DOCUMENTS

| | | |
|---|---|---|
| 2011/0085051 A1 | 4/2011 | Chi et al. |
| 2017/0293262 A1 | 10/2017 | Rosen |
| 2018/0035046 A1 | 2/2018 | Yuan et al. |
| 2019/0020789 A1 | 1/2019 | Shimano |
| 2019/0313018 A1* | 10/2019 | Ono .................. G02B 3/08 |
| 2020/0084350 A1* | 3/2020 | Kishine ............ G02B 5/1876 |
| 2020/0084376 A1* | 3/2020 | Naruse ............. G02B 5/1876 |

FOREIGN PATENT DOCUMENTS

| | | |
|---|---|---|
| CN | 104115484 A | 10/2014 |
| CN | 107431748 A | 12/2017 |
| CN | 108702440 A | 10/2018 |
| JP | 2008-527944 A | 7/2008 |
| JP | 2008-542863 A | 11/2008 |
| KR | 10-2008-0021040 A | 3/2008 |
| KR | 10-1289330 B1 | 7/2013 |
| WO | 2006/078537 A2 | 7/2006 |
| WO | 2006/125975 A1 | 11/2006 |
| WO | 2016/123529 A1 | 8/2016 |
| WO | 2017/145348 A1 | 8/2017 |

OTHER PUBLICATIONS

Extended European Search Report of EP Application No. 19768570.4, dated Apr. 9, 2021, 09 pages.

International Search Report and Written Opinion of PCT Application No. PCT/JP2019/003031, dated Apr. 16, 2019, 08 pages of ISRWO.

Office Action for CN Patent Application No. 201980017621.1, dated Sep. 8, 2021, 5 pages of Office Action and 5 pages of English Translation.

Boominathan, et al., "Lensless Imaging a computational renaissance", IEEE signal processing magazine, Signal Processing for Computational Photography and Displays, vol. 33, No. 5, Sep. 5, 2016, pp. 23-35.

* cited by examiner

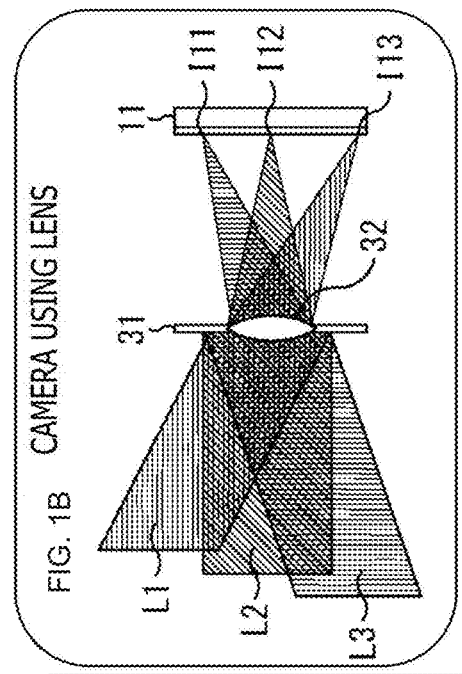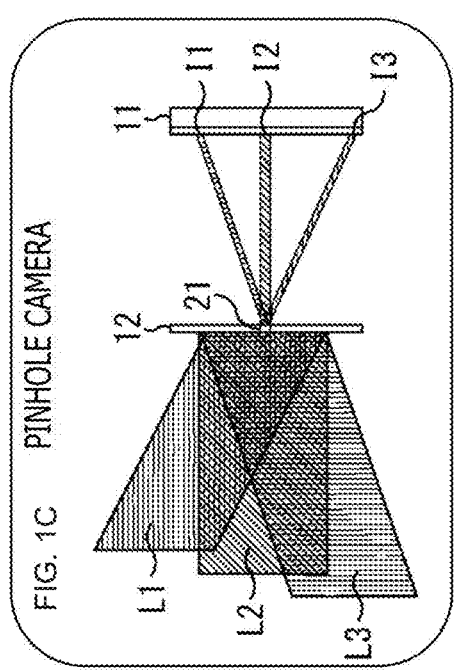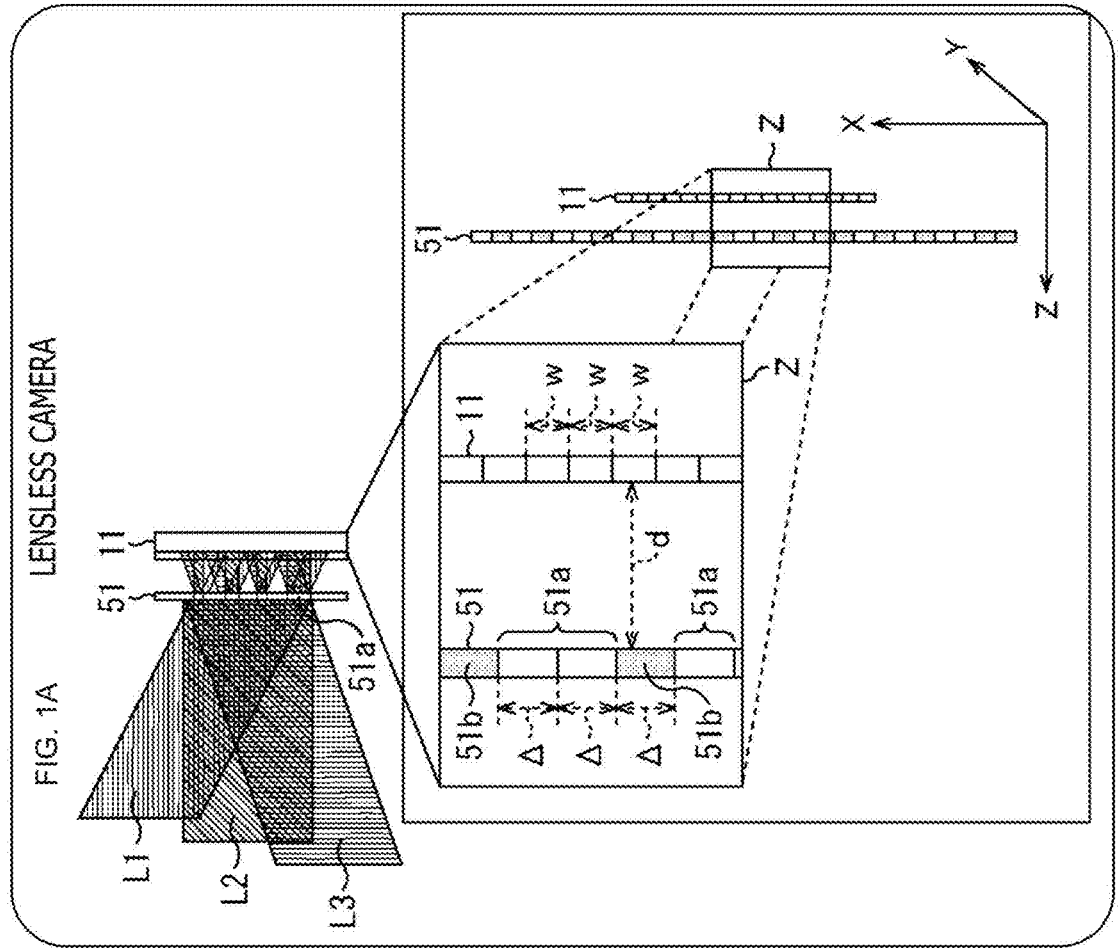

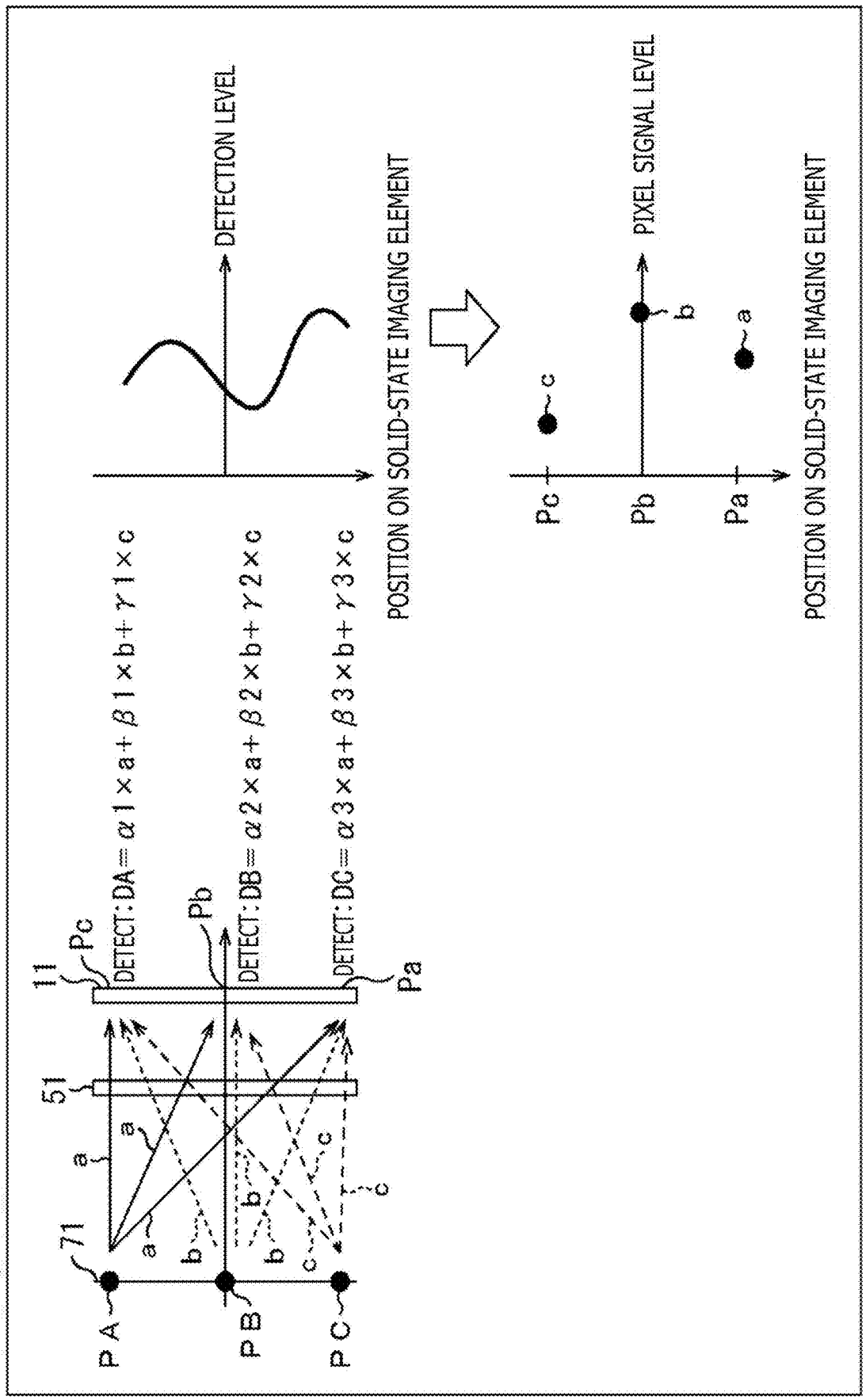

FIG. 10

| IMAGE SENSOR | CHARACTERISTIC | RESOLUTION | PIXEL PITCH | SPECTRAL SENSITIVITY CHARACTERISTIC | |
|---|---|---|---|---|---|
| | | | | WAVELENGTH (nm) | SENSITIVITY (response) |
| | MONOCHROME, SENSING RANGE = 400-600 nm | 256 × 256 PIXELS | 4 μm | 400 | 0.53 |
| | | | | 450 | 0.71 |
| | | | | 500 | 0.81 |
| | | | | 550 | 0.63 |
| | | | | 600 | 0.69 |

| MASK | RESOLUTION | SIZE (Feature Size) | DISTANCE FROM IMAGE SENSOR | ATTACHMENT POSITION |
|---|---|---|---|---|
| | 32 × 32 | 40 μm | APPROXIMATELY 2 mm | SUBSTANTIALLY IMAGE SENSOR CENTER POSITION |

FIG.11

| POINT LIGHT SOURCE P | | | | |
|---|---|---|---|---|
| DISTANCE FROM IMAGE SENSOR | POSITION | LIGHT SOURCE | SPECTRAL SENSITIVITY CHARACTERISTIC | |
| | | | WAVELENGTH (nm) | SENSITIVITY (response) |
| 1m | ON OPTICAL AXIS OF IMAGE SENSOR | SPECTRUM | 400 | 0.07 |
| | | | 450 | 0.21 |
| | | | 500 | 1.0 |
| | | | 550 | 0.71 |
| | | | 600 | 0.32 |

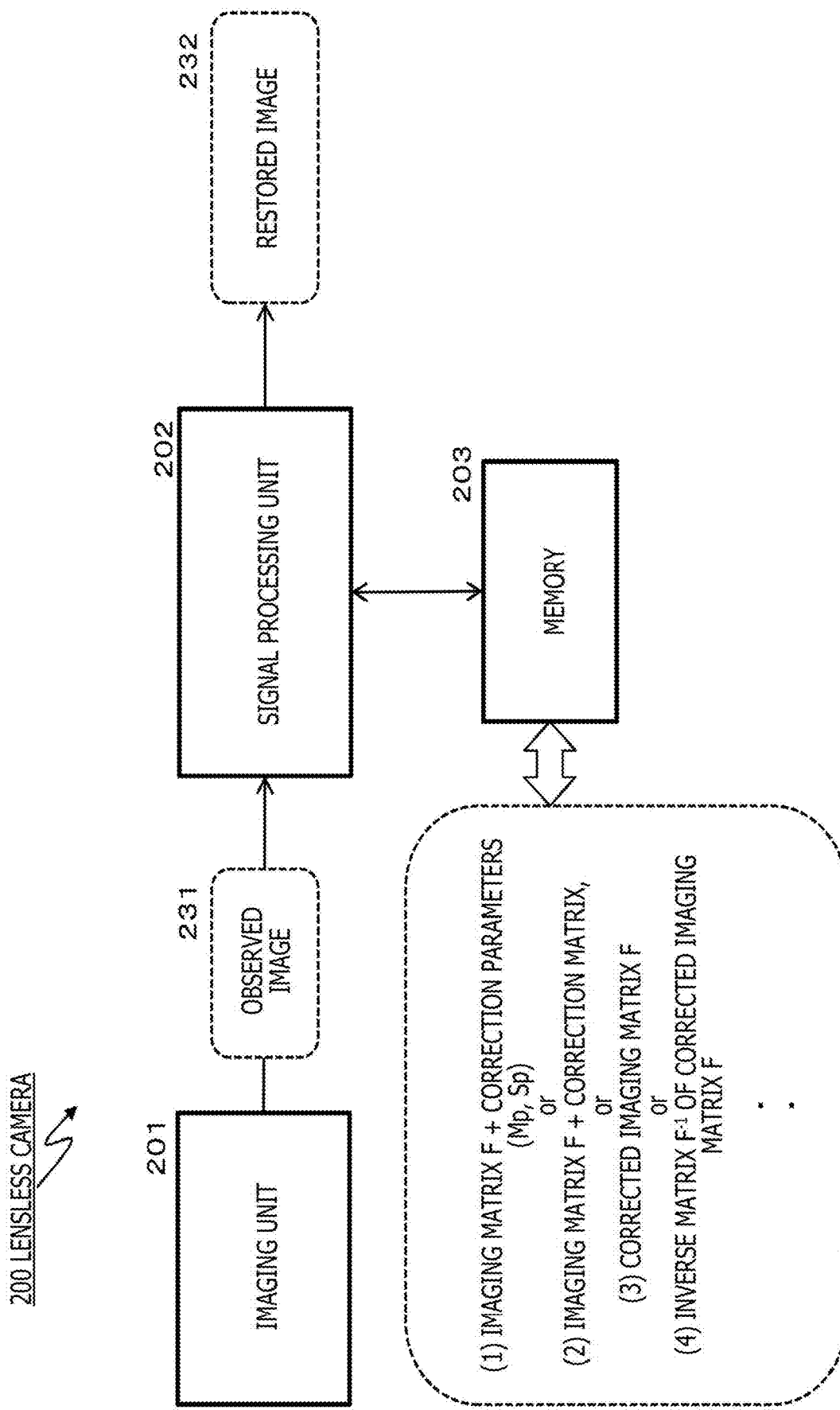

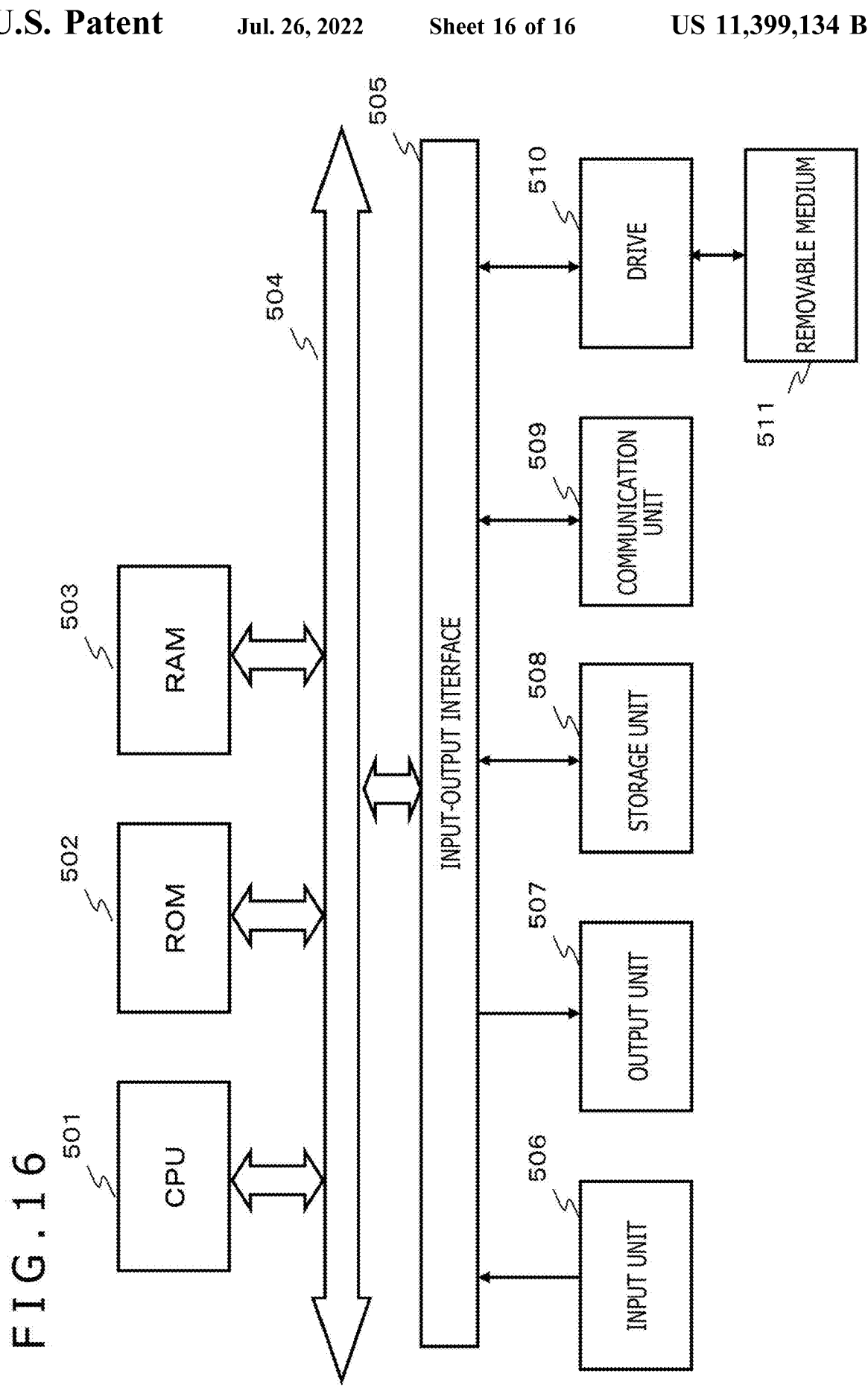

IMAGE PROCESSING APPARATUS, IMAGING APPARATUS, AND IMAGE PROCESSING METHOD

CROSS REFERENCE TO RELATED APPLICATIONS

This application is a U.S. National Phase of International Patent Application No. PCT/JP2019/003031 filed on Jan. 29, 2019, which claims priority benefit of Japanese Patent Application No. JP 2018-046496 filed in the Japan Patent Office on Mar. 14, 2018. Each of the above-referenced applications is hereby incorporated herein by reference in its entirety.

TECHNICAL FIELD

The present disclosure relates to an image processing apparatus, an imaging apparatus, and an image processing method. Particularly, the present disclosure relates to a lensless camera (lensless imaging apparatus), an image processing apparatus that performs calibration of the lensless camera, an imaging apparatus, and an image processing method.

BACKGROUND ART

In recent years, a lensless camera that can photograph an image without using a lens is being developed. A conventional general camera inputs light through a lens into an image sensor that is an imaging element and photographs an image. The lensless camera uses a mask with a mechanism of modulating light, such as a two-dimensional pattern including transmission regions and non-transmission regions of light and a diffraction grating, instead of the lens and inputs the light through the mask into an image sensor. The image sensor photographs an image through the mask. Predetermined signal processing can be applied to the imaging data through the mask to generate a two-dimensional image corresponding to a photographed scene as in the general camera. The lens is not necessary in the lensless camera. Therefore, miniaturization, weight reduction, cost reduction, non-planarity, and the like of the imaging apparatus can be realized.

As described above, the lensless camera inputs the light through the mask into the image sensor. Information indicating how the synchrotron radiation from the scene (photographed scene) is projected on the sensor through the mask can be defined in advance as a matrix, and the matrix and the image (observed image) projected on the sensor can be used to generate an image (restored image) in which the actual scene is reproduced.

Note that the lensless camera is described in, for example, the following literature.

Patent Literature 1 (International Publication No. WO2016/123529),

To apply signal processing to a signal (observed signal) detected by the image sensor of the lensless camera to generate the image (restored image) in which the actual scene is reproduced, various photographing conditions need to be taken into account in the process.

Specifically, photographing conditions, such as
(1) geometrical position of the image sensor with respect to the subject,
(2) intensity and spectral characteristics of the light output from the subject,
(3) modulation by the mask,
(4) positional and geometrical relation between the mask and the sensor, and
(5) spectral sensitivity characteristics of the sensor,
need to be taken into account to execute the signal processing.

Particularly, a change in the physical quantity of the positional and geometrical relation between the mask and the image sensor significantly affects the final image (restored image). However, the variations in the attachment positions of the mask and the sensor cannot be reduced to zero in the production process of the lensless cameras, and there are variations in each camera.

Therefore, in order for each of the produced lensless cameras to generate and output a correct restored image, a process reflecting the positional relation between the mask and the image sensor unique to each lensless camera needs to be executed. In a case where the signal processing is executed to generate the restored image by assuming that the positional and geometrical relation between the mask and the image sensor is different from the actual relation, the restored image may be broken.

A countermeasure is disclosed in Patent Literature 1, in which a display apparatus (for example, LCD in visible light) is arranged in front of the lensless camera, and various vertical and horizontal linear patterns are presented to the lensless camera to thereby calculate a determinant for correcting the positional and geometrical relation between the mask and the sensor.

The method is a method with excellent robustness with respect to noise and diffraction blur. On the other hand, there is a problem that the number of presented patterns is significantly large. For example, in a lensless camera system that obtains an image of N×N pixels, the linear patterns need to be imaged 2N times. Therefore, to calculate the correction matrix corresponding to each camera in the production line of a large number of lensless cameras, an enormous number of linear patterns need to be imaged for each lensless camera, and the processing time becomes enormous.

In addition, the apparatus (display) that executes the presentation process of many types of linear patterns also causes an increase in the cost. For example, if the lensless camera is a camera that photographs a visible light image, an inexpensive display, such as an LCD, that outputs visible light can be used. However, the cost increases in the case of using a band other than the visible light, such as a case of using, for example, infrared light. In this case, the apparatus (display) that outputs many types of linear patterns needs to be an apparatus (display) of an infrared output type. There is a problem that considerable cost is required to install, for example, a large number of apparatuses (displays) of an infrared light output type in a wavelength band equal to or higher than short infrared of 1000 µm and above.

CITATION LIST

Patent Literature

[PTL 1]
International Publication No. WO2016/123529

SUMMARY

Technical Problems

The present disclosure has been made in view of, for example, the foregoing problems, and an object of the present disclosure is to provide an image processing apparatus, an imaging apparatus, and an image processing method that can perform calibration of a lensless camera without executing a presentation process of many types of linear patterns and that can execute an optimal process corresponding to variations and the like in the attachment positions of masks and sensors.

Solution to Problems

A first aspect of the present disclosure provides an image processing apparatus including a signal processing unit that receives a photographed image as an output of an image sensor of a lensless camera to generate a restored image. The signal processing unit executes image processing using data unique to camera generated based on at least positional relation information of a mask and the image sensor of the lensless camera to generate the restored image.

Furthermore, a second aspect of the present disclosure provides an image processing apparatus that executes a calibration process of receiving a photographed image obtained by photographing one point light source in a forward direction of an optical axis of a lensless camera and a simulation image estimated to be acquired by photographing one point light source in the forward direction of the optical axis of the lensless camera in a case where a positional relation between a mask and an image sensor of the lensless camera indicates reference positions, applying a correction process to the simulation image, selecting a corrected simulation image in which a difference from the photographed image is small, and generating data unique to camera that can be applied to an image restoration process in the lensless camera based on corrected data applied to the corrected simulation image.

Furthermore, a third aspect of the present disclosure provides an imaging apparatus including: an imaging unit including a mask provided with transmission regions and non-transmission regions of light set as a two-dimensional pattern and an image sensor that receives light through the mask; a memory storing data unique to camera generated in a comparison process of a photographed image, which is obtained by photographing one point light source in a forward direction of an optical axis of the imaging unit, and a reference image; and a signal processing unit that receives a photographed image as an output of the image sensor to generate a restored image. The signal processing unit executes image processing using the data unique to camera stored in the memory to generate the restored image.

Furthermore, a fourth aspect of the present disclosure provides an image processing method executed by an image processing apparatus, in which the image processing apparatus includes a signal processing unit that receives a photographed image as an output of an image sensor of a lensless camera to generate a restored image, and the signal processing unit executes image processing using data unique to camera generated based on at least positional relation information between a mask and the image sensor of the lensless camera to generate the restored image.

Furthermore, a fifth aspect of the present disclosure provides an image processing method of executing a calibration process of a lensless camera executed by an image processing apparatus. The image processing apparatus receives a photographed image obtained by photographing one point light source in a forward direction of an optical axis of a lensless camera and a simulation image estimated to be acquired by photographing one point light source in the forward direction of the optical axis of the lensless camera in a case where a positional relation between a mask and an image sensor of the lensless camera indicates reference positions, applies a correction process to the simulation image, selects a corrected simulation image in which a difference from the photographed image is small, and generates data unique to camera that can be applied to an image restoration process in the lensless camera based on corrected data applied to the corrected simulation image.

Note that other objects, features, and advantages of the present disclosure will become apparent from more detailed description based on the embodiments and the attached drawings of the present disclosure described later. Note that the system in the present specification denotes a logical set configuration of a plurality of apparatuses, and the apparatuses of each configuration may not be in the same housing.

Advantageous Effect of Invention

According to a configuration of an embodiment of the present disclosure, a configuration is realized that can execute image processing reflecting data unique to camera, such as positional relation information between a mask and an image sensor of a lensless camera, to generate a highly accurate restored image. Note that the advantageous effects described in the present specification are illustrative only, and the advantageous effects are not limited. There may also be additional advantageous effects.

BRIEF DESCRIPTION OF DRAWINGS

FIGS. 1A, 1B, and 1C are diagrams describing a photographing principle of a lensless camera.

FIG. 2 is a diagram describing the photographing principle of the lensless camera.

FIG. 10 is a diagram describing specifications of a configuration executing the calibration process of the present disclosure.

FIG. 11 is a diagram describing specifications of the configuration executing the calibration process of the present disclosure.

FIG. 15 is a block diagram illustrating a configuration example of a lensless camera.

FIG. 16 is a diagram describing a hardware configuration example of an image processing apparatus.

DESCRIPTION OF EMBODIMENTS

Figure 3:
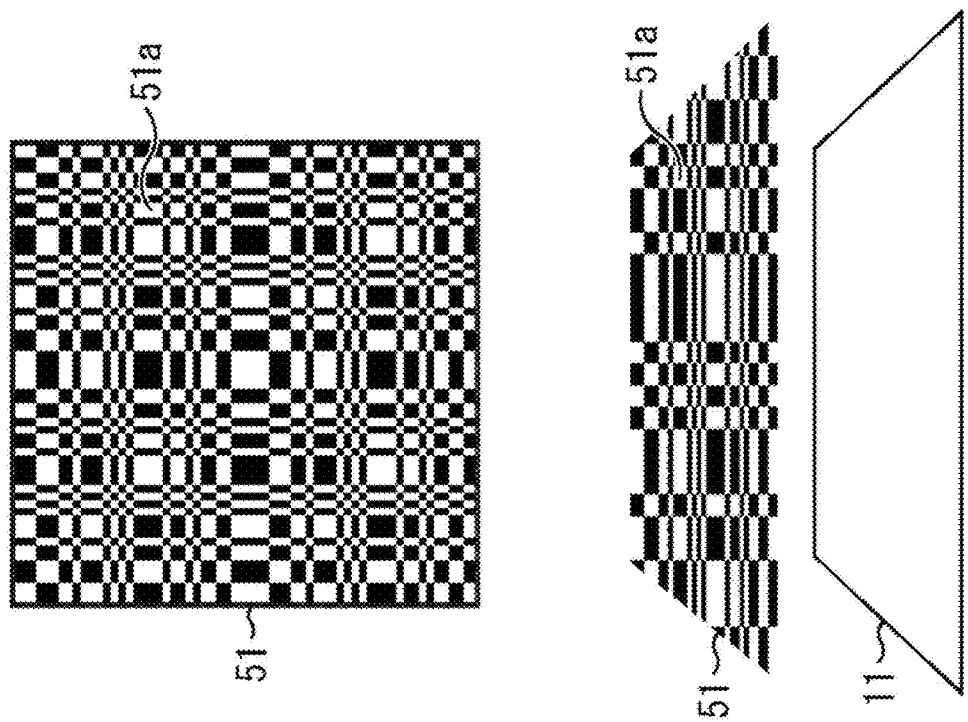
FIG. 3 is a diagram describing an example of a mask of the lensless camera.

Hereinafter, details of an image processing apparatus, an imaging apparatus, and an image processing method of the present disclosure will be described with reference to the drawings. Note that the details will be described according to the following items.
1. Overview and Principle of Lensless Camera
2. Signal Processing for Generating Restored Image from Observed Image of Lensless Camera
3. Physical Quantity Related to Imaging Matrix F
4. Details of Camera Calibration Process
5. Configuration Example of Apparatus that Executes Calibration Process and Camera
6. Processing Example of Simplified Calculation Process
7. Advantageous Effects of Image Processing of Present Disclosure
8. Hardware Configuration Example of Image Processing Apparatus
9. Conclusion of Configuration of Present Disclosure
[1. Overview and Principle of Lensless Camera]

First, an overview and a principle of a lensless camera will be described. With reference to FIGS. 1A, 1B, 1C, and 2, the overview of the lensless camera (lensless imaging apparatus) will be described in comparison with a configuration of a general camera (imaging camera). FIGS. 1A, 1B, and 1C illustrate imaging principles of the following three types of cameras.
FIG. 1A Lensless camera
FIG. 1B Camera with lens
FIG. 1C Pinhole camera FIG. 1C, The pinhole camera includes: a pinhole 21 provided as a hole with respect to a light-shielding film 12; and an image sensor (solid-state imaging element) 11. In the case of the imaging apparatus including the pinhole, light beams L1 to L3 emitted from different light sources on a subject surface transmit through the pinhole 21 and are photographed as images in pixels 11 to 13 on the image sensor (solid-state imaging element) 11 as illustrated in the drawing of FIG. 1C, the pinhole camera on the lower right part of FIGS. 1A, 1B, and 1C.

In the case of the imaging apparatus including the pinhole camera, the image sensor (solid-state imaging element) 11 uses only light beams corresponding to one pixel in the light beams L1 to L3 emitted from the light sources to form an image, and the image enters each pixel on the image sensor (solid-state imaging element) 11. Therefore, a dark image is photographed.

FIG. 1B, The camera with lens in the upper right part of FIGS. 1A, 1B, and 1C is provided with an imaging lens 32 at the center of a light-shielding film 31, and the imaging lens 32 condenses the light beams L1 to L3 as indicated by light beams I11 to I13. An image is formed on the image sensor (solid-state imaging element) 11, and the image sensor (solid-state imaging element) 11 photographs the image.

In the case of FIG. 1B, the camera with lens on the upper right part of FIGS. 1A, 1B, and 1C, the image sensor (solid-state imaging element) 11 forms an image including light with light intensity that is total light intensity of all of the light beams L1 to L3, and the image enters the image sensor (solid-state imaging element) 11. Therefore, an image with a sufficient amount of light is photographed in each pixel of the image sensor (solid-state imaging element) 11.

As illustrated in the drawing of FIG. 1B, the camera with lens on the upper right part of FIGS. 1A, 1B, and 1C, the imaging lens 32 is used, and a set of point light sources form a subject. Therefore, in the imaging of the subject, the light beams emitted from a plurality of point light sources on the subject surface are condensed to form an image, and the subject is imaged.

As described with reference to FIG. 1B, the camera with lens on the upper right part of FIGS. 1A, 1B, and 1C, the role of the imaging lens 32 is to guide each light beam emitted from each point light source, that is, diffused light, to the image sensor (solid-state imaging element) 11. Therefore, an image corresponding to a final image is formed on the image sensor (solid-state imaging element) 11, and an image including detection signals detected by the pixels on the image sensor (solid-state imaging element) 11 is an observed image in which an image is formed.

However, the size of the imaging apparatus (imaging element) is determined by the imaging lens and the focal length of the imaging lens, and there is a limitation in the miniaturization.

On the other hand, FIG. 1A, the lensless camera illustrated in the left side of FIGS. 1A, 1B, and 1C is not provided with the imaging lens or the pinhole. The FIG. 1A, lensless camera uses the image sensor (solid-state imaging element) 11 and a mask 51 to image the subject on the subject surface.

The FIG. 1A, lensless camera illustrated on the left side of FIGS. 1A, 1B, and 1C is provided with the mask 51 including openings 51a in a plurality of sizes in the front stage of the image sensor 11. The light beams L1 to L3 from the light sources are modulated and enter the imaging surface of the image sensor 11. The pixels on the image sensor (solid-state imaging element) 11 receive the light beams L1 to L3.

Here, the mask 51 is a mask including a mask pattern provided with the openings 51a and light-shielding portions 51b in randomly set sizes in the horizontal direction and the vertical direction in unit sizes Δ as illustrated on the lower part of FIG. 1A, the lensless camera in FIGS. 1A, 1B, and 1C. The unit size Δ is a size at least larger than a pixel size. In addition, a gap of a small distance d is provided between the image sensor 11 and the mask 51. In the example illustrated in FIGS. 1A, 1B, and 1C, a pitch between the pixels on the image sensor 11 is w. According to the configuration, the light beams L1 to L3 are modulated and enter the image sensor 11 according to the sizes of the unit size Δ and the distance d.

In more details, it is assumed that the light sources of the light beams L1 to L3 in the upper drawing of FIG. 1A the lensless camera in FIGS. 1A, 1B, and 1C are, for example, point light sources PA, PB, and PC as illustrated on the upper left part of FIG. 2, and light beams with light intensities a, b, and c enter at positions Pa, Pb, and Pc on the image sensor 11 after transmitting through the mask 51.

In the case of the lensless camera, the incident light is modulated by the openings 51a randomly set on the mask 51, and the detection sensitivity of each pixel has directivity according to the incident angle as illustrated on the upper left part of FIG. 2. Here, the fact that the detection sensitivity of each pixel has incident angle directivity denotes that the light sensitivity characteristics vary according to the incident angle of the incident light depending on the region on the image sensor 11.

That is, in the case where the light sources included in a subject surface 71 are point light sources, light beams with the same light intensity emitted by the same point light source enter the image sensor 11. The light beams are modulated by the mask 51, and the incident angle changes in each region on the imaging surface of the image sensor 11. Furthermore, by using the mask 51 to change the incident angle of the incident light according to the region on the image sensor 11, the light sensitivity characteristics, that is, the incident angle directivity, are provided. Therefore, even when the light intensity of the light beams is the same, the mask 51 provided in the front stage of the imaging surface of the image sensor 11 detects the light beams at different sensitivity in each region on the image sensor 11. As a result, detection signals in different detection signal levels are detected in each region.

More specifically, as illustrated on the upper right part of FIG. 2, detection signal levels DA, DB, and DC of the pixels at the positions Pa, Pb, and Pc on the image sensor 11 are represented by the following Equations (1) to (3), respectively.

$$DA = \alpha 1 \times a + \beta 1 \times b + \gamma 1 \times c \qquad (1)$$

$$DB = \alpha 2 \times a + \beta 2 \times b + \gamma 2 \times c \qquad (2)$$

$$DC = \alpha 3 \times a + \beta 3 \times b + \gamma 3 \times c \qquad (3)$$

Here, $\alpha 1$ is a coefficient for a detection signal level "a" set according to the incident angle of the light beam from the point light source PA on the subject surface 71 to be restored at the position Pa on the image sensor 11.

In addition, $\beta 1$ is a coefficient for a detection signal level b set according to the incident angle of the light beam from the point light source PB on the subject surface 71 to be restored at the position Pa on the image sensor 11.

Furthermore, $\gamma 1$ is a coefficient for the detection signal level c set according to the incident angle of the light beam from the point light source PC on the subject surface 71 to be restored at the position Pa on the image sensor 11.

Therefore, ($\alpha 1 \times a$) of the detection signal level DA is a value indicating the detection signal level based on the light beam from the point light source PA at the position Pc.

In addition, ($\beta 1 \times b$) of the detection signal level DA is a value indicating the detection signal level based on the light beam from the point light source PB at the position Pc.

Furthermore, ($\gamma 1 \times c$) of the detection signal level DA is a value indicating the detection signal level based on the light beam from the point light source PC at the position Pc.

Therefore, the detection signal level DA is expressed as a composite value obtained by multiplying the components of the point light sources PA, PB, and PC at the position Pa by the coefficients $\alpha 1$, $\beta 1$, and $\gamma 1$, respectively. Hereinafter, the coefficients $\alpha 1$, $\beta 1$, and $\gamma 1$ will be collectively referred to as a coefficient set.

Similarly, a coefficient set $\alpha 2$, $\beta 2$, and $\gamma 2$ in relation to the detection signal level DB in the point light source PB corresponds to the coefficient set $\alpha 1$, $\beta 1$, and $\gamma 1$ in relation to the detection signal level DA in the point light source PA.

In addition, a coefficient set $\alpha 3$, $\beta 3$, and $\gamma 3$ in relation to the detection signal level DC in the point light source PC corresponds to the coefficient set $\alpha 1$, $\beta 1$, and $\gamma 1$ in relation to the detection signal level DA in the point light source PA.

However, the detection signal levels of the pixels at the positions Pa, Pb, and Pc are values expressed by the sums of products of the light intensities a, b, and c of the light beams emitted by the point light sources PA, PB, and PC, respectively, and the coefficients. Therefore, the light intensities a, b, and c of the light beams emitted by the point light sources PA, PB, and PC, respectively, are mixed in the detection signal levels, and the detection signal levels are different from the levels in the image of the subject.

That is, the coefficient set $\alpha 1$, $\beta 1$, and $\gamma 1$, the coefficient set $\alpha 2$, $\beta 2$, and $\gamma 2$, the coefficient set $\alpha 3$, $\beta 3$, and $\gamma 3$, and the detection signal levels DA, DB, and DC are used to form simultaneous equations, and the light intensities a, b, and c are solved to obtain pixel values of the positions Pa, Pb, and Pc as illustrated on the lower right part of FIGS. 1A, 1B, and 1C. As a result, the restored image (final image) that is a set of the pixel values is reconstructed and restored.

Furthermore, in a case where the distance between the image sensor 11 and the subject surface 71 illustrated on the upper left part of FIG. 2 changes, each of the coefficient set $\alpha 1$, $\beta 1$, and $\gamma 1$, the coefficient set $\alpha 2$, $\beta 2$, and $\gamma 2$, and the coefficient set $\alpha 3$, $\beta 3$, and $\gamma 3$ changes. The coefficient sets can be changed to reconstruct the restored images (final images) of the subject surface at various distances.

Therefore, imaging can be performed once to reconstruct the images of the subject surface at various distances from the imaging position by changing the coefficient sets according to various distances.

As a result, a phenomenon called out-of-focus, in which an image is photographed in a defocused state by an imaging apparatus using a lens, does not have to be considered in the imaging using the lensless camera. As long as the subject to be imaged is imaged within the angle of view, the coefficient sets corresponding to the distance can be changed to thereby reconstruct the images of the subject surface at various distances after the imaging.

Note that the detection signal levels illustrated on the upper right part of FIG. 2 are not detection signal levels corresponding to the image provided with the image of the subject. Therefore, the detection signal levels are not pixel values. In addition, the detection signal levels illustrated on the lower right part of FIG. 2 are signal values of the pixels corresponding to the image provided with the image of the subject, that is, values of the pixels of the restored image (final image). Therefore, the detection signal levels are pixel values.

The configuration can realize a so-called lensless camera that does not require an imaging lens or a pinhole. As a result, the imaging lens, the pinhole, and the like are not required components. Therefore, the height of the imaging apparatus can be reduced, that is, the thickness with respect to the incident direction of light can be reduced in the configuration for realizing the imaging function. In addition, by changing the coefficient sets in various ways, the restored images (final images) on the subject surface at various distances can be reconstructed and restored.

Note that hereinafter, the image before the reconstruction photographed by the image sensor will be simply referred to as an observed image, and the image reconstructed and restored by applying signal processing to the observed image will be referred to as a restored image (final image). Therefore, by changing the coefficient sets in various ways, the images on the subject surface 71 at various distances can be reconstructed as final images from one observed image.

FIG. 3 is a diagram illustrating a configuration example of the imaging element in the lensless camera. An upper part is a top view of the mask 51, and a lower part is a perspective view of the mask 51 and the image sensor (solid-state imaging element) 11 as viewed from the upper side.

In the imaging element of a general lensless camera, the unit size of the openings 51a in the mask 51 is uniformly set throughout the entire region as illustrated for example in FIG. 3. The image sensor 11 photographs one image as a whole based on the light transmitted through the mask 51.

[2. Signal Processing for Generating Restored Image from Observed Image of Lensless Camera]

Figure 4:
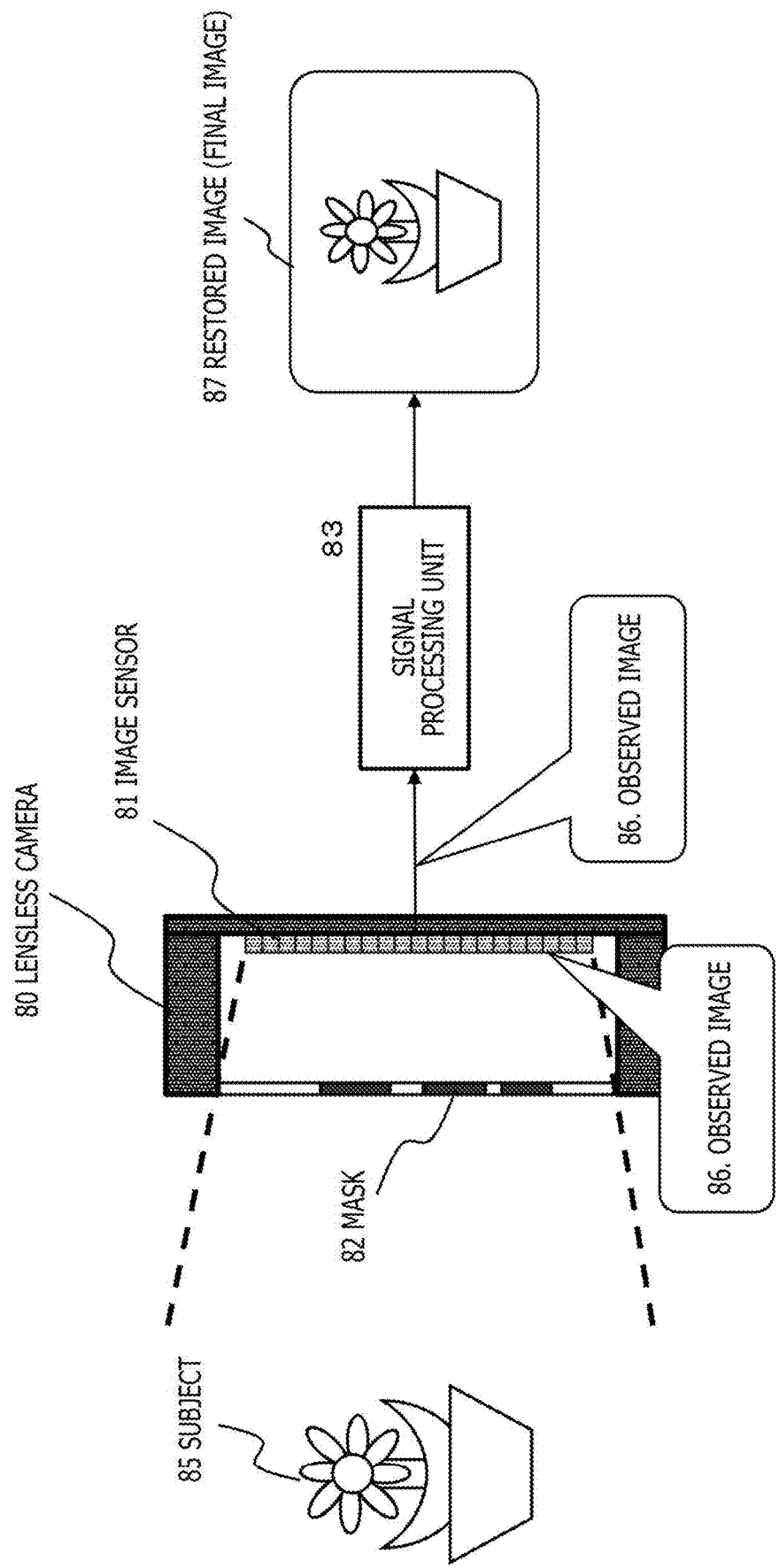
FIG. 4 is a diagram describing a photographing process example of the lensless camera.

Next, signal processing for generating a restored image from an observed image of a lensless camera will be described. FIG. 4 is a diagram illustrating a schematic configuration of a lensless camera 80. As illustrated in FIG. 4, the lensless camera 80 includes a mask 82 arranged in front of an image sensor 81. The mask 82 is a mask in which transmission regions and non-transmission regions of light are set as a two-dimensional pattern. The light through the mask 82 is input to the image sensor.

FIG. 4 illustrates a configuration example of photographing a subject 85 and outputting a restored image (final image) 87 in which the subject image is restored. Note that an image before reconstruction imaged by the image sensor (solid-state imaging element) 81 is an observed image 86, and an image reconstructed and restored by a signal processing unit 83 applying signal processing to the observed image 86 is the restored image (final image) 87. The restored image (final image) 87 is an image including the subject in the photographed scene as in a normal camera provided with camera.

The image (observed image 86) through the mask 82 is photographed by the image sensor 81. Imaging data through the mask 82, that is, the observed image 86 on the image sensor 1 is input to the signal processing unit 83. The signal processing unit 83 applies predetermined signal processing to the observed image 86 on the image sensor 81 to generate the restored image (final image) 87 as a two-dimensional image corresponding to the photographed scene as in a general camera.

In the signal processing of the signal processing unit 83 that generates the restored image 87 in which the actual scene is reproduced from the observed image 86 on the image sensor 81, various photographing conditions need to be taken into account to execute the process. Specifically, for example, photographing conditions including (1) geometrical position of the image sensor with respect to the subject, (2) intensity and spectral characteristic of the light output from the subject, (3) modulation by the mask, (4) positional and geometrical relation between the mask and the sensor, and (5) spectral sensitivity characteristic of the sensor need to be taken into account to execute the signal processing.

Particularly, a physical change in the positional and geometrical relation between the mask and the image sensor significantly affects the final image (restored image), and it is difficult to handle the positional and geometrical relation as a known value in the system. In a case where the signal processing is executed to generate the restored image by assuming that the positional and geometrical relation between the mask and the image sensor is different from the actual relation, the restored image may be broken. Therefore, the positional and geometrical relation between the mask and the image sensor unique to each lensless camera needs to be taken into account to execute the process.

The photographing principle of the observed image photographed by the lensless camera 80 illustrated in FIG. 4 can be formularized and expressed by the following (Equation 1).

$$y = Fx + n \qquad \text{(Equation 1)}$$

where y: observed signal (one-dimensional data) of the image sensor 81 x: scene vector (value (one-dimensional data) of synchrotron radiation of the photographed scene)

n: noise

F: imaging matrix

Note that x is a value of the synchrotron radiation of the photographed scene, and x also corresponds to the pixel value of the restored image 87. This is because the restored image 87 corresponds to an image in which the values of the synchrotron radiation of the photographed scene are reproduced.

As can be understood from (Equation 1), the observed signal y of the image sensor 81 of the lensless camera 80 is a signal in which the noise n is added to the light obtained by modulating the scene vector (x) of the photographed scene by the imaging matrix F.

Figure 5:
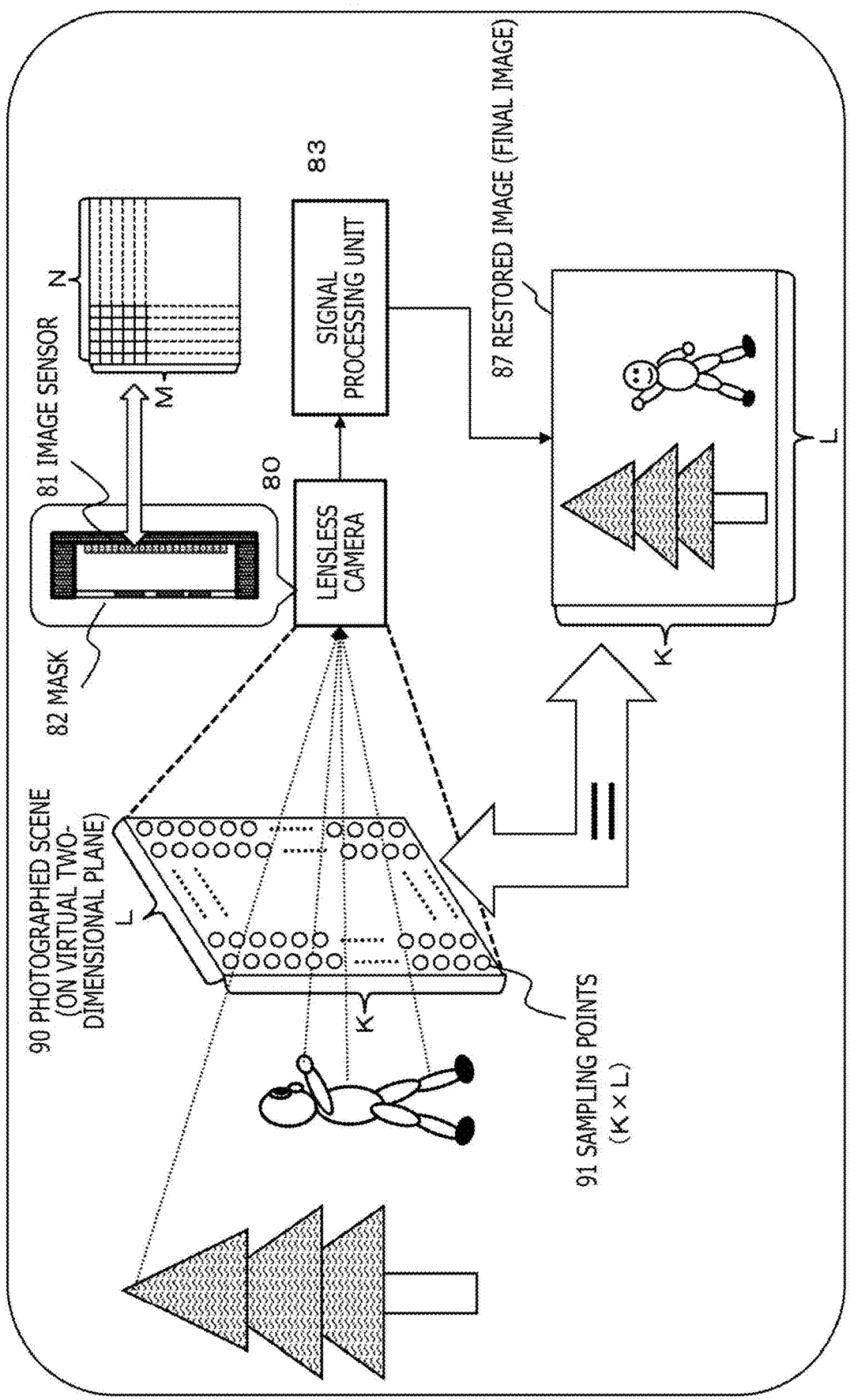
FIG. 5 is a diagram describing a photographing process and an image restoration process of the lensless camera.

The details of (Equation 1) will be described with reference to FIG. 5 and the following drawings. FIG. 5 illustrates the lensless camera 80, the signal processing unit 83, and the restored image 87 as in FIG. 4. The lensless camera 81 includes the image sensor 81 and the mask 82. The image sensor 81 is a sensor with an M×N pixel configuration including N pixels horizontally and M pixels vertically as illustrated in the figure.

In the example illustrated in FIG. 5, the lensless camera 80 photographs an image of a photographing region including a tree and a person. Eventually, the restored image 87 including the tree and the person is generated by an image restoration process of the signal processing unit. The resolution of the restored image 87 is a resolution of K×L pixels including L pixels horizontally and K pixels vertically.

The resolution of the restored image 87 depends on signal processing in the signal processing unit 83. Specifically, the resolution depends on the degree of subdivision and analysis of the synchrotron radiation from the photographed subject. A photographed scene 90 illustrated in FIG. 5 is a two-dimensional plane set in the passing region of the synchrotron radiation from the subject. The two-dimensional plane is a two-dimensional plane parallel to the image sensor 81, and the light entering the image sensor 81 from the subject passes through the two-dimensional plane. The restored image 87 is an image obtained by reproducing the subject light passing through the two-dimensional plane.

A plurality of circles illustrated in the photographed scene 90 on the two-dimensional plane illustrated in FIG. 5 is set as sampling points, and the synchrotron radiation of the sampling point corresponds to x (value of synchrotron radiation of photographed scene) in (Equation 1), that is, $$y = Fx + n \qquad \text{(Equation 1).}$$

This x is reproduced to determine the value of each pixel of the restored image. That is, the signal processing unit 83 calculates the synchrotron radiation x on the basis of sampling points on the photographed scene 90 on the two-dimensional plane illustrated in FIG. 5 to set the pixel values of the restored image 87.

In the example illustrated in FIG. 5, the number of sampling points on the photographed scene 90 on the two-dimensional plane is K×L points including L points horizontally and K points vertically. The signal processing unit 83 receives the output of the image sensor 81 with M×N pixel configuration of the lensless camera 80, that is, the observed image obtained through the mask 81, and analyzes the synchrotron radiation of the K×L sampling points on the photographed scene 90 to generate the restored image 87 with resolution of K×L pixels including L pixels horizontally and K pixels vertically.

Next, a specific calculation process example of (Equation 1), that is, $$y = Fx + n \quad \text{(Equation 1)},$$

will be described with reference to FIGS. 6A, 6B, 6C, and 6D.

FIGS. 6A, 6B, 6C, and 6D illustrate a formula expressing each data matrix form included in (Equation 1). That is, FIGS. 6A, 6B, 6C, and 6D illustrate four pieces of data including FIG. 6A image sensor observed values y 101, FIG. 6B imaging matrix F 102, FIG. 6C scene vector x (sampling point synchrotron radiation (=restored image)) 103, and FIG. 6D noise n 104.

Figure 6:
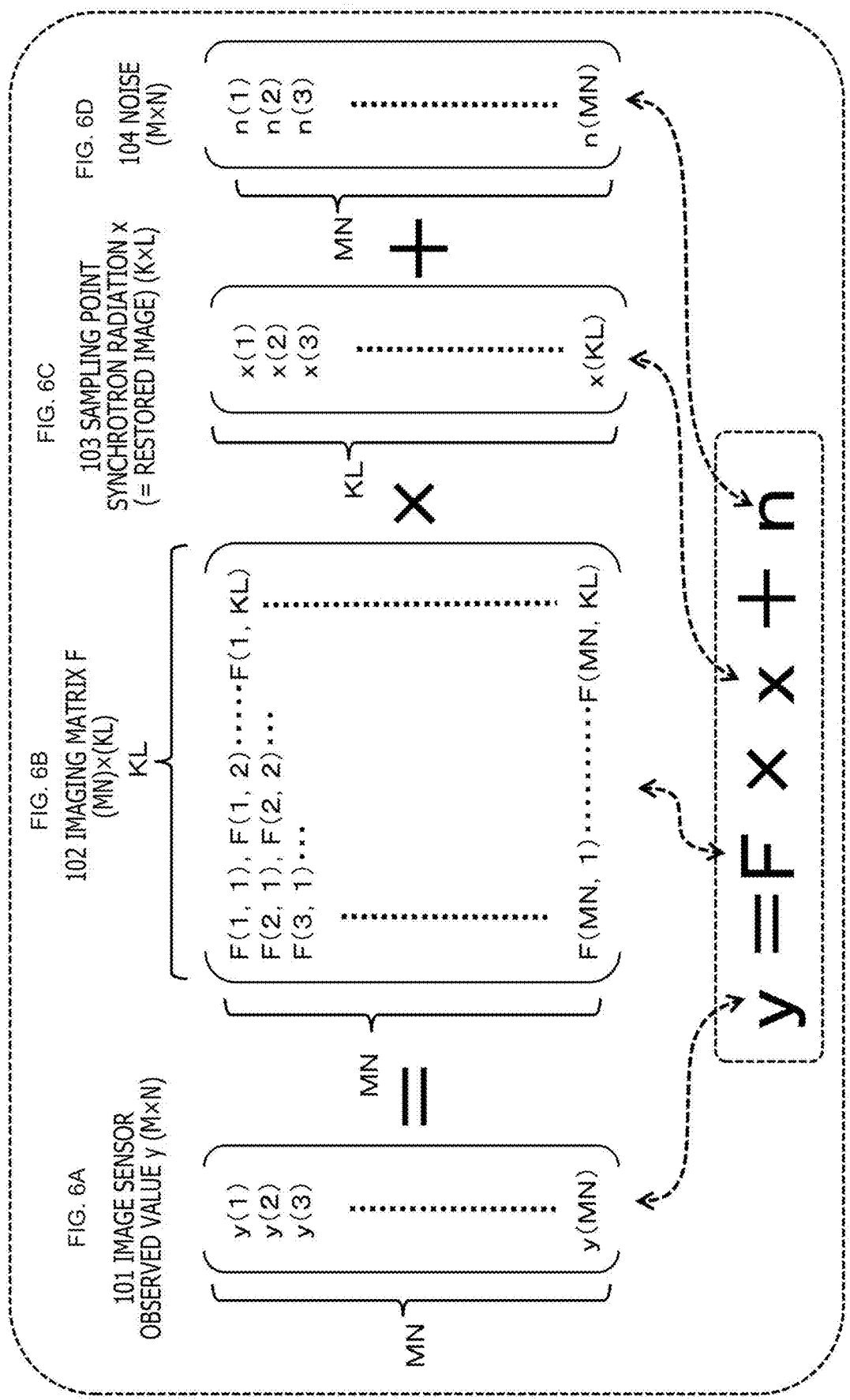
FIGS. 6A, 6B, 6C, and 6D are diagrams describing a correspondence example of a photographed image of the lensless camera and a restored image.

FIG. 6A, The image sensor observed values y 101 include a matrix of MN rows, one column including observed values (y(1), y(2), . . . y(MN)) of the pixels of the M×N image sensor.

FIG. 6B, The imaging matrix F 102 is a matrix including correspondence information of FIG. 6A, the image sensor observed values y 101 and FIG. 6C, the scene vector x (sampling point synchrotron radiation (=restored image)) 103 and is a matrix of MN rows, KL columns.

The multiplication result of FIG. 6B, the imaging matrix F 102 and FIG. 6C, the scene vector x (sampling point synchrotron radiation (=restored image)) 103+FIG. 6D, the noise n 104 provides FIG. 6A, the image sensor observed values y 101, that is, the pixel values of the MN pixels of the image sensor.

Note that, in the case of calculating the pixel values of the KL pixels of the restored image from FIG. 6A, the image sensor observed values y 101, an inverse matrix of the imaging matrix F 102 is used.

FIG. 6C, The scene vector x (sampling point synchrotron radiation (=restored image)) 103 is a matrix of KL rows, one column including KL elements (x(1), x(2), . . . x(KL)) equal to the number of sampling points set in the photographed scene 90 of the two-dimensional plane described with reference to FIG. 5, that is, the number of pixels of the restored image 87.

FIG. 6D, The noise n 104 is noise corresponding to the pixels of the M×N image sensor and is a matrix of MN rows, one column including values (n(1), n(2), . . . n(MN)) of the noise of the pixels.

In this way, the computation of (Equation 1), that is, $$y = Fx + n \quad \text{(Equation 1)},$$

indicates to perform matrix computation illustrated in FIGS. 6A, 6B, 6C, and 6D.

Assuming that the number of pixels of the image sensor 81 is MN pixels, and the resolution of the restored image is KL pixels, the imaging matrix F is a two-dimensional matrix with (M×N)×(K×L) dimensionality.

The scene vector x is multiplied by the imaging matrix F, and the M×N-dimensional noise vector n is added to obtain the observed vector y including one-dimensional data of the values of the pixels on the image sensor 81. Note that an element in each row of the imaging matrix F denotes light from each point in the scene reaching one pixel of the image sensor 81 through the mask 82. The meaning of the element in each row of the imaging matrix F will be described with reference to FIGS. 7A, 7B, 7C, and 7D.

FIGS. 7A, 7B, 7C, and 7D simply illustrate the data included in (Equation 1) as in FIGS. 6A, 6B, 6C, and 6D. That is, FIGS. 7A, 7B, 7C, and 7D illustrate four pieces of data including FIG. 7A image sensor observed values y 101, FIG. 7B imaging matrix F 102, FIG. 7C scene vector x (sampling point synchrotron radiation (=restored image)) 103, and FIG. 7D noise n 104.

Figure 7:
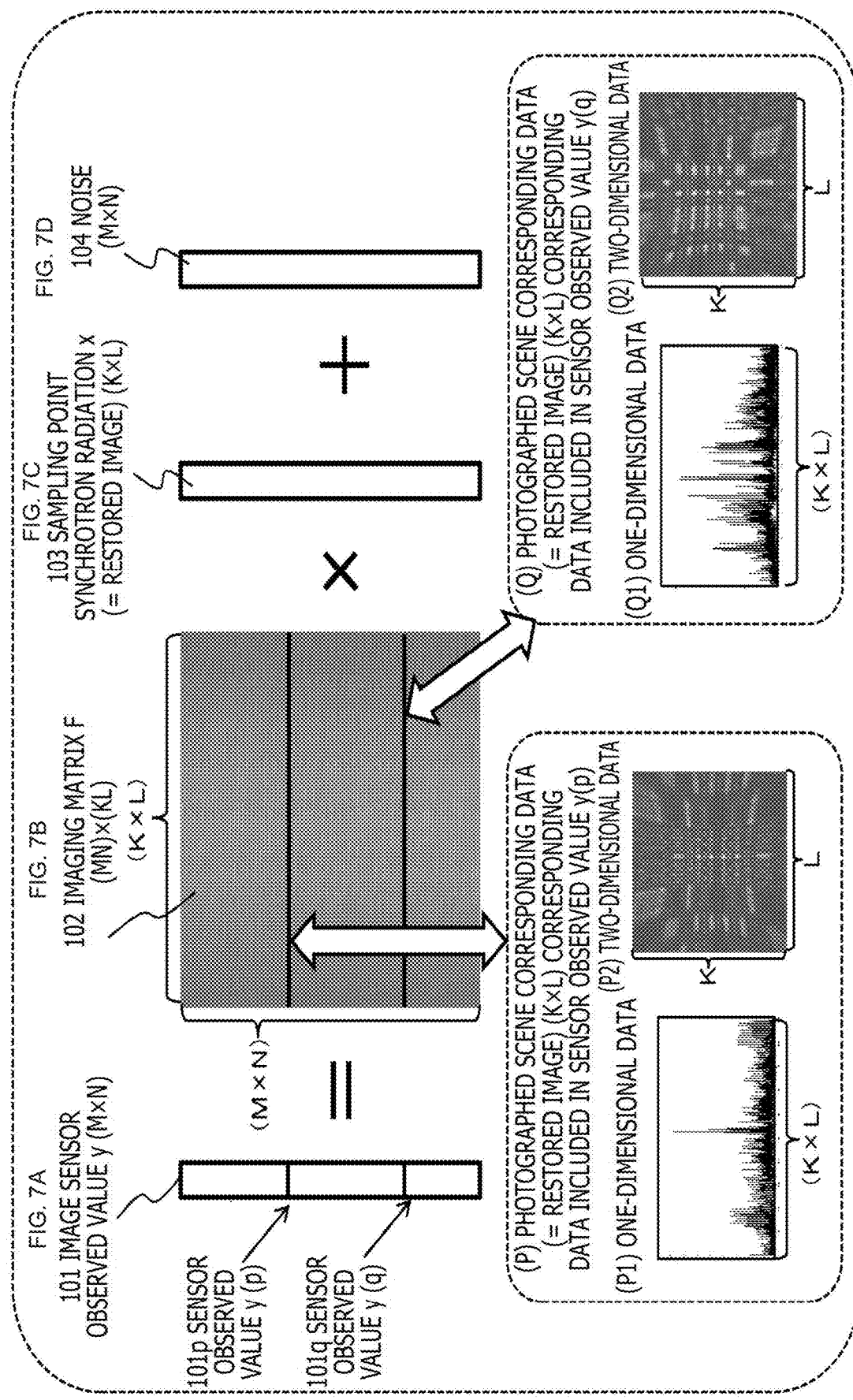
FIGS. 7A, 7B, 7C, and 7D are diagrams describing the correspondence example of the photographed image of the lensless camera and the restored image.

FIGS. 7A, 7B, 7C, and 7D illustrate recording positions of two observed values included in FIG. 7A, the image sensor observed values y 101, the two sensor observed values including a sensor observed value y(p) 101p and a sensor observed value y(q) 101q.

The sensor observed value y(p) 101p is an element in a pth row of the matrix of FIG. 7A, the image sensor observed values y 101 and is an observed value (pixel value) of the pth pixel of the image sensor 81 including MN pixels.

The sensor observed value y(q) 101q is an element in a qth row of the matrix of FIG. 7A, the image sensor observed values y 101 and is an observed value (pixel value) of the qth pixel of the image sensor 81 including MN pixels.

The synchrotron radiation from various sampling points of the photographed scene 90 described with reference to FIG. 5 enters each pixel of the image sensor 81. That is, in each of the sensor observed value y(p) 101p and the sensor observed value y(q) 101q, the synchrotron radiation from a plurality of sampling points in the KL sampling points illustrated in FIG. 5 enters.

Output light components of the KL sampling points included in the sensor observed values y(p) 101p of the matrix included in FIG. 7A, the image sensor observed values y 101 are recorded in the row (pth row) of the "FIG. 7B, imaging matrix F 102" corresponding to the recording row of the sensor observed values y(p) 101p. A specific example of the data of the row in FIG. 7B, the imaging matrix F 102 is (P) photographed scene corresponding data (=restored image) (K×L) corresponding data included in the sensor observed values y (p) illustrated on the lower left side of FIGS. 7A, 7B, 7C, and 7D.

(P1) is one-dimensional data illustrating a graph of the values of KL elements in the row (pth row) of the "FIG. 7B, imaging matrix F 102." The horizontal axis is an axis indicating the element positions of the KL columns from the first column on the left end of the row (pth row) of the "FIG. 7B, imaging matrix F 102" to the right end. The vertical axis indicates the light intensity. That is, this is data in which the synchrotron radiation components of the KL sampling points included in the sensor observed values y(p) 101p are graphed.

(P2) is two-dimensional data in which the KL pieces of data recorded in (P1) the one-dimensional data are expanded on a two-dimensional plane with resolution corresponding to the restored image including L pixels in the horizontal direction and K pixels in the vertical direction.

In addition, output light components of the KL sampling points included in the other sensor observed values y(q) 101q of the matrix included in FIG. 7A, the image sensor observed values y 101 are recorded in the row (qth row) of the "FIG. 7B, imaging matrix F 102" corresponding to the recording row of the sensor observed values y(q) 101q. A specific example of the data of the row in FIG. 7B, the imaging matrix F 102 is (Q) photographed scene corresponding data (=restored image) (K×L) corresponding data included in the sensor observed values y (q) illustrated on the lower right side of FIGS. 7A, 7B, 7C, and 7D.

(Q1) is one-dimensional data illustrating a graph of the values of KL elements in the row (qth row) of the "FIG. 7B, imaging matrix F 102." The horizontal axis is an axis indicating the element positions of the KL columns from the first column on the left end of the row (qth row) of the "FIG. 7B, imaging matrix F 102" to the right end. The vertical axis indicates the light intensity. That is, this is data in which the synchrotron radiation components of the KL sampling points included in the sensor observed value y(q) 101q are graphed.

(Q2) is two-dimensional data in which the KL pieces of data recorded in (Q1) the one-dimensional data are expanded on a two-dimensional plane with resolution corresponding to the restored image including L pixels in the horizontal direction and K pixels in the vertical direction.

(P1) and (Q2) illustrate the two-dimensional data of the synchrotron radiation components of the sampling points in two rows of the "FIG. 7B, imaging matrix F 102," and when the two-dimensional data of the synchrotron radiation components of the sampling points in all of the rows (MN rows) of the "FIG. 7B, imaging matrix F 102" is superimposed, the restored image 87 is generated.

Incidentally, (Equation 1), that is, the principle formula of the imaging system $$y=Fx+n,$$

can be used not only for the lensless camera, but also for imaging using a conventional lens, imaging through a diffusion plate, and the like. The different point in the lensless camera is that the modulation using the mask and the positional and geometrical relation between the mask and the sensor are related to the imaging matrix F.

[3. Physical Quantity Related to Imaging Matrix F]

Figure 8:
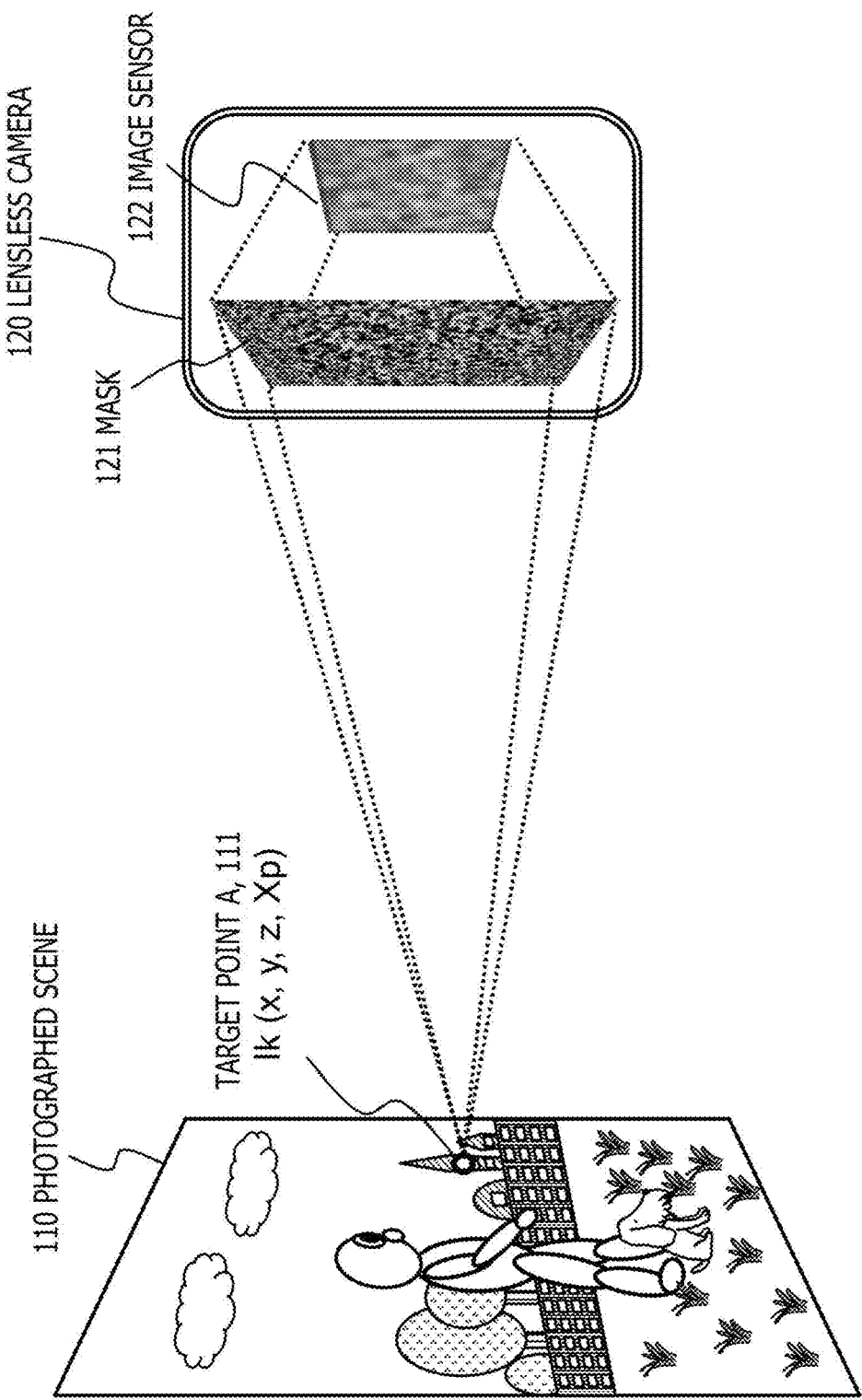
FIG. 8 is a diagram describing an example of a used image of the lensless camera.

Next, the physical quantity related to the imaging matrix F will be described. FIG. 8 is a diagram illustrating a used image of the lensless camera.

Elements of the physical quantity related to the imaging matrix F will be described with reference to FIG. 8. One target point A, 111 is set in a photographed scene 110. The target point A, 111 is one point of the subject where light of spectral characteristic Xp, intensity Ik enters the lensless camera 120 from a position (x, y, z).

In this case, an observed value Y(j) observed by a pixel j in an image sensor 122 of a lensless camera 120 can be represented by the following (Equation 2), that is, $$Y(j)=G(x,y,z,Xp,Mg,Mp,Sp,j)\times Ik, \qquad \text{(Equation 2)}$$

which is (Equation 2) described above.

Here,

Mg denotes a geometrical shape of the mask,

Mp denotes a geometrical position of the mask with respect to the sensor,

Sp denotes a spectral sensitivity characteristic of the image sensor 122, and j denotes a pixel identifier of the image sensor.

The equation indicating the photographing principle of the observed image photographed by the lensless camera described above is $$y=Fx+n \qquad \text{(Equation 1),}$$

where y: observed signal (one-dimensional data) of the image sensor 81, x: scene vector (value (one-dimensional data) of synchrotron radiation of photographed scene), n: noise, and F: imaging matrix.

Based on (Equation 1) and (Equation 2), it can be rephrased that the imaging matrix F is provided by the function G of each parameter included in (Equation 2). That is, matrix constituent elements F(j) of the corresponding row of the pixel j in the image sensor among the constituent elements of the imaging matrix F are defined by the following (Equation 3).

$$F(j)=G(x,y,z,Xp,Mg,Mp,Sp,j) \qquad \text{(Equation 3)}$$

It can be stated from (Equation 3) that the imaging matrix F is changed by the values of the parameters (x, y, z, Xp, Mg, Mp, Sp, j) included in the function G. Among the parameters, the coordinates (x, y, z) indicating the light emitting position of the light of the target point and the spectral characteristic Xp of the light of the target point depend on the photographed scene.

In addition, the shape Mg of the mask is also a known value.

The positional relation Mp of the mask with respect to the sensor is a value unique to camera that varies in each lensless camera. That is, in a case where, for example, a sensor and a mask are attached to each camera in the manufacturing process of the lensless cameras, there are variations in the manufactured cameras.

Therefore, the positional relation Mp of the mask with respect to the sensor is a different value in each camera. The value needs to be precisely acquired to generate the imaging matrix F unique to camera based on the acquired value, or some correction process unique to camera regarding a common imaging matrix F, such as, for example, a correction process using a correction matrix, is necessary.

Even if a process using the imaging matrix F without the correction process or a generation process of the restored image using the inverse matrix is executed, a normal restored image cannot be generated, and a broken restored image is generated.

Note that a known value can be used for the spectral sensitivity characteristic Sp of the image sensor 122 in most cases, and a correction based on this is not necessary. However, in a case where, for example, the image sensor is a microbolometer or the like, the observed spectral characteristic may vary according to the temperature or the like of the sensor, and a correction corresponding to the spectral sensitivity characteristic Sp of the image sensor 122 may be made.

[4. Details of Camera Calibration Process]

As described above, the parameters unique to lensless camera that affect the imaging matrix F include the following two parameters.

(a) Positional relation Mp of the mask with respect to the sensor (b) Spectral sensitivity characteristic Sp of image sensor If the imaging matrix F or the inverse matrix of the imaging matrix F common to all of the cameras is used to execute the generation process of the restored image without taking the variations of the parameters into account, a normal restored image cannot be generated. A specific example of a camera calibration process for solving the problem will be described.

An overview of the camera calibration process described below is as follows.

(S01) Use a lensless camera to be calibrated to acquire a photographed image of a point light source (point light source observed image using an image sensor).

(S02) Conduct a simulation to generate a photographed image of a point light source (point light source observed image using an image sensor)(=reference image) using an ideal camera (reference camera) provided with defined reference parameters.

Note that the defined reference parameters include the following parameters.

(a) Positional relation Mp of the mask with respect to the sensor (b) Spectral sensitivity characteristic Sp of the image sensor (S03) In the simulation image (reference image), sequentially change the parameters unique to camera that affect the imaging matrix F, that is, the parameters including (a) positional relation Mp of the mask with respect to the sensor and (b) spectral sensitivity characteristic Sp of the image sensor, to generate a simulation image (corrected reference image).

(S04) Compare the simulation image (corrected reference image) and the photographed image to acquire ideal parameters unique to camera.

The overview of the camera calibration process executed in the process of the present disclosure includes the processes (S01) to (S04).

The fact that an image directly reflecting the geometrical shape of the mask pattern is observed in the case where the lensless camera images the point light source of only one point is used in the calibration process. Note that in the case of changing the imaging matrix F according to the subject distance, the distance between the lensless camera and the point light source can be changed to obtain the imaging matrix F corresponding to the subject distance according to each distance or the correction matrix corresponding to the distance.

Note that in generating the simulation image, it is preferable, if possible, to also take into account the diffraction phenomenon caused by the mask. The diffraction phenomenon occurs depending on the geometrical shape of the mask, specifically, the size of slit where the light passes through or the like. Particularly, when the distance d between the center of the image sensor and the center of the mask changes, the influence of the diffraction on the image on the image sensor significantly changes, and it is preferable to generate a simulation image reflecting the diffraction phenomenon corresponding to the distance d.

Note that a generally known diffraction model can be used to simulate the diffraction phenomenon. For example, a Fresnel diffraction model that is a representative diffraction model can be used.

Figure 9:
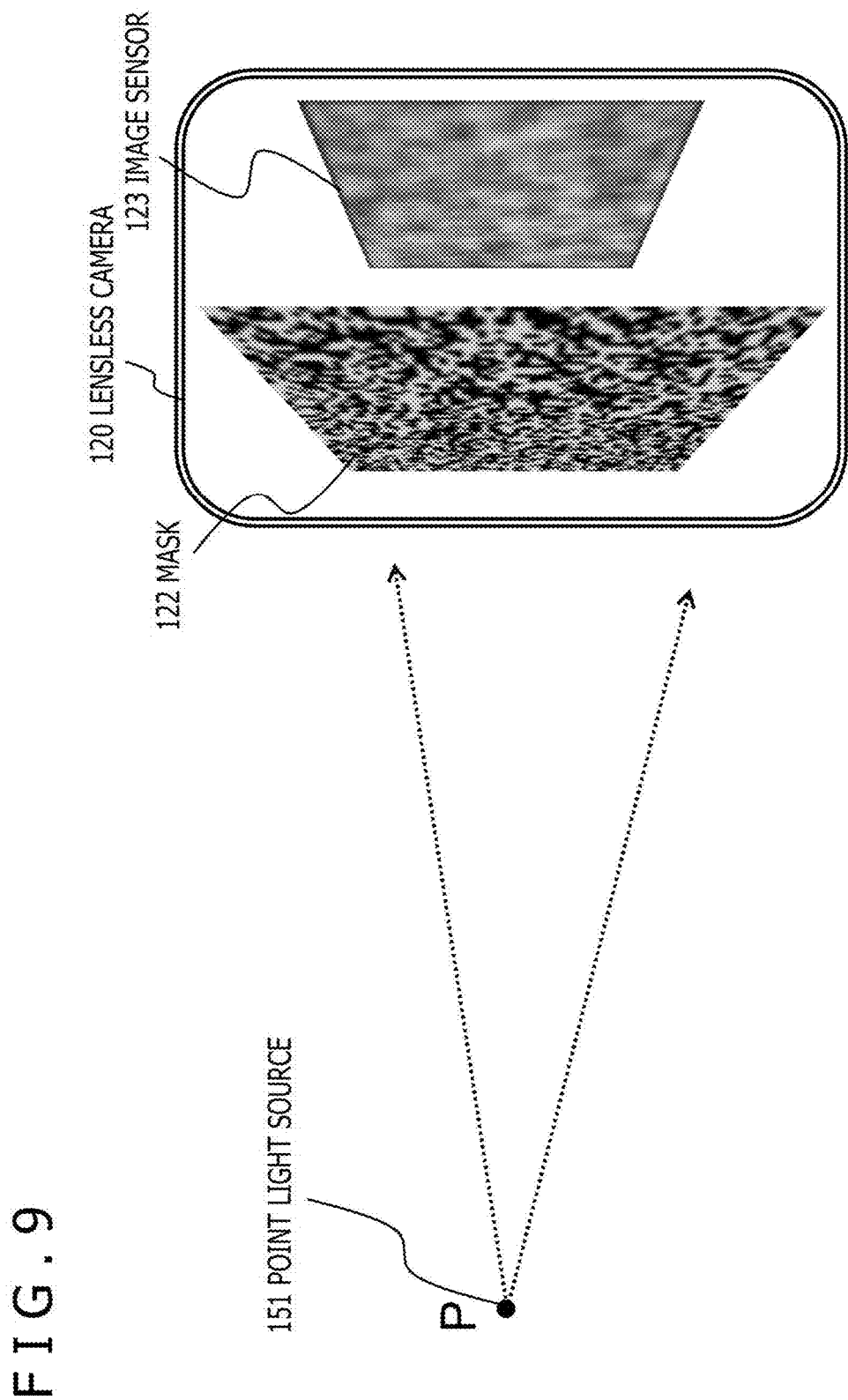
FIG. 9 is a diagram describing an acquisition processing example of the photographed image in a calibration process of the present disclosure.

FIG. 9 is a diagram illustrating an execution example of the process of the first step (S01) in the calibration process, that is, the photographed image acquisition process of (S01) using the lensless camera to be calibrated to acquire the observed image of the point light source (point light source observed image using the image sensor).

A point light source P, 151 is arranged on the front surface of the lensless camera 120, on the extension of the optical axis connecting the center of the sensor and the center of the mask installation assumed position. The lensless camera 120 includes the image sensor 121 and the mask 122, and the light of the point light source P, 151 enters the image sensor 122 through the opening of the mask 122.

FIGS. 10 and 11 illustrate specifications of constituent elements including the image sensor 122, the mask 121, and the point light source 151 used in the actually executed calibration process.

As illustrated in FIG. 10, the image sensor 122 has the following specifications.

Characteristic=monochrome sensor, sensing range=400 to 600 nm, resolution=256×256 pixels, pixel pitch=4 micrometers, spectral sensitivity characteristic=(wavelength (nm), sensitivity (response))=(400, 0.53), (450, 0.71), (500, 0.81), (550, 0.63), (600, 0.69)

In addition, the mask 121 has the following specifications.

Resolution=32×32

Size (Feature Size)=40 micrometers, distance from image sensor=approximately 2 mm, attachment position=substantially image sensor center position, In addition, as illustrated in FIG. 11, the point light source 151 has the following specifications.

Distance from image sensor=1 m, position=on optical axis of image sensor, light source (source)=spectrum, spectral sensitivity characteristic=(wavelength (nm), sensitivity (response))=(400, 0.07), (450, 0.21), (500, 1.0), (550, 0.71), (600, 0.32)

The lensless camera 120 including the image sensor 122 and the mask 121 and the point light source 151 with the specifications are used to execute the calibration process. Note that here, the parameter to be corrected first is the geometrical position Mp of the mask 121.

The geometrical position Mp of the mask includes a plurality of elements. First, the geometrical position Mp of the mask is expressed by the following function G2.

$$Mp = G2(R, T, d)$$

Input parameters of the function G2 include three parameters including a rotation parameter R, a translation parameter T, and a distance parameter d between the image sensor center and the mask center.

Note that each of the rotation parameter R and the translation parameter T can be expressed as a correction matrix for the matrix including (x, y, z) defining the three-dimensional position of the mask and can be expressed as a rotation matrix R and a translation matrix T.

Note that Mp=G2 (Ho, d) may be set, and the rotation matrix R and the translation matrix T may be expressed by using a homography matrix Ho in which the rotation matrix R and the translation matrix T are set as one matrix.

In the following description, three parameters including the rotation parameter R, the translation parameter T, and the distance parameter d between the image sensor center and the mask center are used in the process.

A detailed sequence of the calibration process of the present disclosure will be described according to a flow chart illustrated in FIG. 12.

Processes from step S101 illustrated in the flow will be sequentially described.

(Step S101)

First, the lensless camera 120 to be calibrated photographs the point light source P, 151 in step S101.

Figure 13:
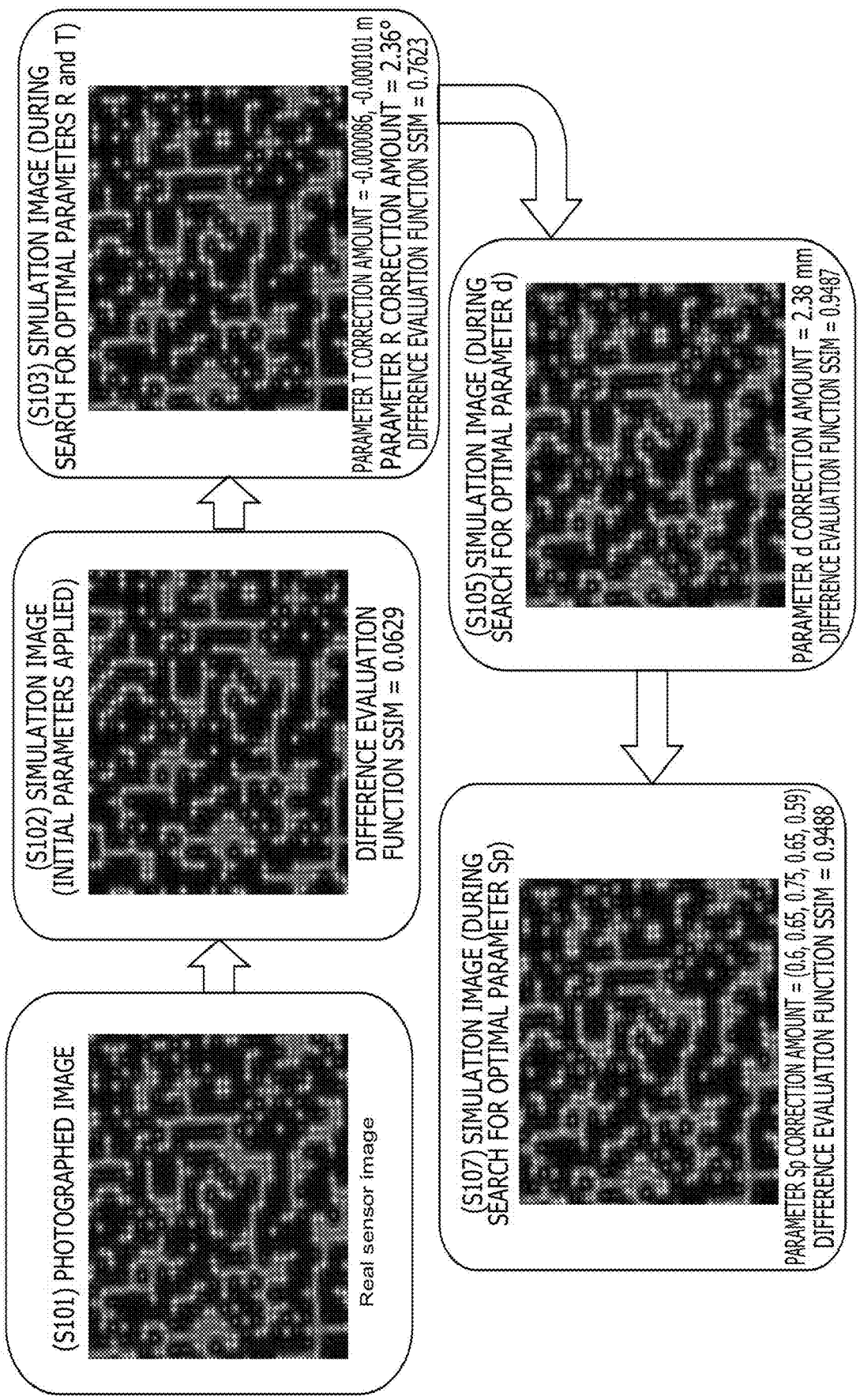
FIG. 13 is a diagram describing a specific example of images used in the calibration process of the present disclosure.

FIG. 13 (S101) illustrates an example of the point light source photographed image. The image is an output from an image sensor 123 obtained by the photographing process of the point light source 151 described with reference to FIG. 9 and is an image directly reflecting the pattern of the mask 122.

(Step S102)

Next, initial parameters are used to generate a simulation image (reference image) in step S102. The simulation image (reference image) is image data output from the image sensor in a case where it is assumed that the lensless camera with an ideal parameter configuration photographs the point light source 151 illustrated in FIG. 9.

The initial parameters are predefined reference parameters. For example, for the (a) positional relation Mp of the mask with respect to the sensor, a parameter Mp (reference parameter Mp) in a case where it is assumed that the mask is accurately attached to a defined reference position with respect to the sensor is used.

Note that in the case of executing the process of steps S106 and S107 that is an optional process described in a later stage, a predefined reference parameter Sp is also set as an initial parameter for the parameter (b) spectral sensitivity characteristic Sp of image sensor to generate a simulation image (reference image).

FIG. 13 (S102) illustrates an example of the simulation image generated in step S102. The simulation image is a simulation image generated based on the assumption that the mask is accurately attached to the predefined reference position with respect to the sensor, that is, based on the assumption that the positional relation of the mask with respect to the sensor is an ideal positional relation, and the simulation image is an ideal image.

(Step S103)

Next, in step S103, affine transformation or homography transformation is performed by applying various rotation parameters R and translation parameters T to the simulation image generated in step S102 to generate simulation images (corrected reference images) rotated and translated in various ways. The simulation images are compared with the photographed image acquired in step S101.

In the comparison process, the simulation image with the smallest image difference from the photographed image is selected, and the rotation parameter R and the translation parameter T applied to the simulation image are extracted.

Note that, for example, an evaluation function (SSIM: Structural Similarity) is used for the evaluation process of the image difference between the photographed image and the simulation image. The SSIM is an image difference evaluation function indicating a value closer to 0 for a larger image difference and closer to 1 for a smaller image difference.

FIG. 13 (S103) illustrates an example of the simulation image (corrected reference image) with the minimum difference from the photographed image searched in step S103. The simulation image illustrated in FIG. 13 (S103) is a simulation image generated by translating the simulation image generated in step S102 by applying a predetermined translation parameter T and further rotating the simulation image by applying a predetermined rotation parameter R.

The simulation image is a simulation image generated by translating and rotating the simulation image photographed by the camera with the ideal configuration generated in step S102 to bring the simulation image close to the actual photographed image (photographed image acquired in S101).

The lower part of the image of (S103) in FIG. 13 illustrates amounts of correction applied to generate the image. That is, the parameter correction amounts include parameter T correction amount=−0.000086 m, −0.000101 m and parameter R correction amount=2.36°.

The parameter correction amounts mean that the simulation image (corrected reference image) illustrated in (S103) of FIG. 13 is a simulation image (corrected reference image) generated by translating the simulation image (reference image) generated in step S102 by −0.000086 m in the x direction and −0.000101 m in the y direction and rotating the simulation image by 2.36° clockwise. This means that an image with the smallest difference from the actual photographed image (photographed image acquired in S101) is generated by the correction.

As illustrated in FIG. 13, the difference evaluation function of the simulation image generated in (S103) is SSIM=0.7623. This is a difference evaluation value between the simulation image (corrected reference image) generated in (S103) and the actual photographed image (photographed image acquired in S101). Incidentally, the difference evaluation function SSIM of the first simulation image (reference image) generated in (S102) illustrated in FIG. 13 is SSIM=0.0629.

As described above, the SSIM is an image difference evaluation function indicating a value closer to 0 for a larger image difference and closer to 1 for a smaller image difference. The SSIM indicates that as a result of the translation and the rotation process of the simulation image in step S103, the value of the difference evaluation function SSIM has approached 1, and the difference from the photographed image is reduced.

(Step S104)

Next, in step S104, a plurality of simulation images is generated by setting a plurality of different mask-to-image-sensor distance parameters d (d1, d2, d3 . . . dn) for the simulation image (corrected reference image) obtained in step S103, that is, the simulation image obtained by applying the correction (rotation parameter R, translation parameter T) for minimizing the difference from the photographed image.

The distance d between the mask and the sensor is optimized next. The distance d between the mask and the sensor changes not only the image magnification, but also the magnitude of the diffraction blur. Therefore, the parameters d are provided at some intervals to generate a plurality of simulation images.

(Step S105)

Next, in step S105, a simulation image with the minimum difference from the photographed image is searched from the plurality of simulation images (corrected reference images) generated by setting the plurality of different mask-to-image-sensor distance parameters d (d1, d2, d3 . . . dn) generated in step S104, and the mask-to-image-sensor distance parameter d of the simulation image is acquired.

Note that the search for the simulation image with the minimum difference from the photographed image in the process, that is, the search process of the parameter d, is performed by applying, for example, a coarse-fine search process.

The coarse-fine search process is a search process, in which the search is performed at coarse intervals first, and the search width is gradually reduced.

FIG. 13 (S105) illustrates an example of the simulation image (corrected reference image) in which the mask-to-image-sensor distance parameter d acquired in step S105 is applied.

The simulation image is a simulation image (corrected reference image) re-corrected by further changing the parameter d, that is, the mask-to-image-sensor distance parameter d, to bring the simulation image generated in step S103, that is, the simulation image (corrected reference image) after the application of the translation and the rotation process for the position close to the actual photographed image, closer to the actual photographed image (photographed image acquired in S101).

The lower part of the image of (S105) in FIG. 13 illustrates an amount of correction applied for generating the image. That is, the parameter correction amount is parameter d correction amount=2.38 mm.

This means that the simulation image (corrected reference image) illustrated in (S105) of FIG. 13 is a simulation image generated by re-correcting the simulation image generated in step S103 by setting mask-to-image-sensor distance parameter d=2.38 mm. An image with the smallest difference from the actual photographed image (photographed image acquired in S101) is generated by the correction.

As illustrated in FIG. 13, the difference evaluation function of the simulation image generated in (S105) is SSIM=0.9487. This is a difference evaluation value between the simulation image generated in (S105) and the actual photographed image (photographed image acquired in S101). Incidentally, the difference evaluation function SSIM of the simulation image generated in (S103) illustrated in FIG. 13 is SSIM=0.7623.

As described above, the SSIM is an image difference evaluation function indicating a value closer to 0 for a larger image difference and closer to 1 for a smaller image difference. The value of the difference evaluation function SSIM of the simulation image in step S105 is closer to 1 than the simulation image generated in step S103, and this indicates that the difference from the photographed image is reduced.

(Step S106)

The next processes of steps S106 and S107 are optional processes and can be skipped.

The processes are executed in the case of calculating a correction value regarding (b) spectral sensitivity characteristic Sp of image sensor.

Note that as described above, in the case of executing the processes of steps S106 and S107, the simulation image generated in step S102 needs to be a simulation image generated by setting the parameter (b) spectral sensitivity characteristic Sp of image sensor as a predefined reference parameter Sp (initial parameter).

In step S106, a plurality of simulation images is generated by setting a plurality of different image sensor spectral sensitivity characteristics Sp (Sp1, Sp2, Sp3 . . . Spn) for the simulation image (corrected reference image) acquired in step S105, that is, the simulation image corrected to minimize the difference from the photographed image.

The parameter to be optimized here is the spectral sensitivity characteristic Sp. The values of the parameters Sp are provided at some intervals to generate a plurality of simulation images.

(Step S107)

Next, in step S107, a simulation image (corrected reference image) with the minimum difference from the photographed image is searched from the plurality of simulation images (corrected reference images) generated according to the plurality of different spectral sensitivity characteristics Sp (Sp1, Sp2, Sp3 . . . Spn) generated in step S106, and the spectral sensitivity characteristic Sp of the simulation image is acquired.

Note that the search for the simulation image with the minimum difference from the photographed image in the process, that is, the search process of the spectral sensitivity characteristic Sp, is also performed by applying, for example, the coarse-fine search process.

FIG. 13 (S107) illustrates an example of the simulation image (corrected reference image) in which the spectral sensitivity characteristic Sp acquired in step S107 is applied.

The simulation image is a simulation image (corrected reference image) re-corrected by further changing the parameter Sp, that is, the spectral sensitivity characteristic Sp of the image sensor, to bring the simulation image corrected in step S103 and step S105, that is, the simulation image generated by applying the translation, the rotation, and the change of mask-to-image-sensor distance parameter d, closer to the actual photographed image (photographed image acquired in S101).

The lower part of the image of (S107) in FIG. 13 illustrates an amount of correction applied to generate the image. That is, the parameter correction amount is parameter Sp correction amount=(0.6, 0.65, 0.75, 0.65, 0.59).

The spectral sensitivity characteristics indicate sensitivity (response) corresponding to the wavelengths (nm)=400, 450, 500, 550, 600 nm, respectively.

This means that the simulation image (corrected reference image) illustrated in (S107) of FIG. 13 is a simulation image (corrected reference image) generated by performing a re-correction of setting the spectral sensitivity characteristic Sp of the image sensor to the settings described above, that is, parameter Sp correction amount=(0.6, 0.65, 0.75, 0.65, 0.59), for the simulation image (corrected reference image) generated in step S105. This means an image with the smallest difference from the actual photographed image (photographed image acquired in S101) is generated by the correction.

As illustrated in FIG. 13, the difference evaluation function of the simulation image generated in (S107) is SSIM=0.9488. This is a difference evaluation value between the simulation image generated in (S107) and the actual photographed image (photographed image acquired in S101). Incidentally, the difference evaluation function SSIM of the simulation image generated in (S105) illustrated in FIG. 13 is SSIM=0.9487.

As described above, the SSIM is an image difference evaluation function indicating a value closer to 0 for a larger image difference and closer to 1 for a smaller image difference. The value of the difference evaluation function SSIM of the simulation image in step S107 is closer to 1 than the simulation image generated in step S105, and this indicates that the difference from the photographed image is reduced.

(Step S108)

Next, in step S108, whether the value of the difference evaluation function SSIM indicating the difference between the simulation image (corrected reference image) generated in step S107 and the actual photographed image acquired in step S101 is equal to or greater than a predefined threshold is determined.

In a case where it is determined that the value is equal to or greater than the predefined threshold, the process ends. In a case where the value is not equal to or greater than the predefined threshold, the process from step S102 is repeatedly executed. Eventually, when it is determined that the value is equal to or greater than the predefined threshold in step S108, the process ends.

Note that in the case where the process of steps S106 and S107 is skipped, a process of determining whether the value of the difference evaluation function SSIM indicating the difference between the simulation image generated in step S105 and the actual photographed image acquired in step S101 is equal to or greater than a predefined threshold is executed in step S108.

In a case where it is determined that the value is equal to or greater than the predefined threshold, the process ends. In a case where the value is not equal to or greater than the threshold, the process from step S102 is repeatedly executed. Eventually, when it is determined that the value is equal to or greater than the predefined threshold in step S108, the process ends.

The amount of correction acquired at the end of the process, specifically, the following amount of correction described above with reference to FIG. 13, is data indicating the deviation from the reference parameters of the lensless camera as a current target of calibration or indicating the characteristics. That is, the parameters acquired in step S103 and step S105 including the rotation parameter R, the translation parameter T, and the mask-to-image-sensor distance parameter d are the data indicating the deviation from the reference parameters of the lensless camera as a current target of calibration.

These are parameters indicating (a) the positional relation Mp of the mask with respect to the sensor.

Furthermore, in the case where steps S106 and S107 are executed, the parameter acquired in step S107 including the spectral sensitivity characteristic Sp of the image sensor is the data indicating the characteristic of the lensless camera as a current target of calibration.

Figure 12:
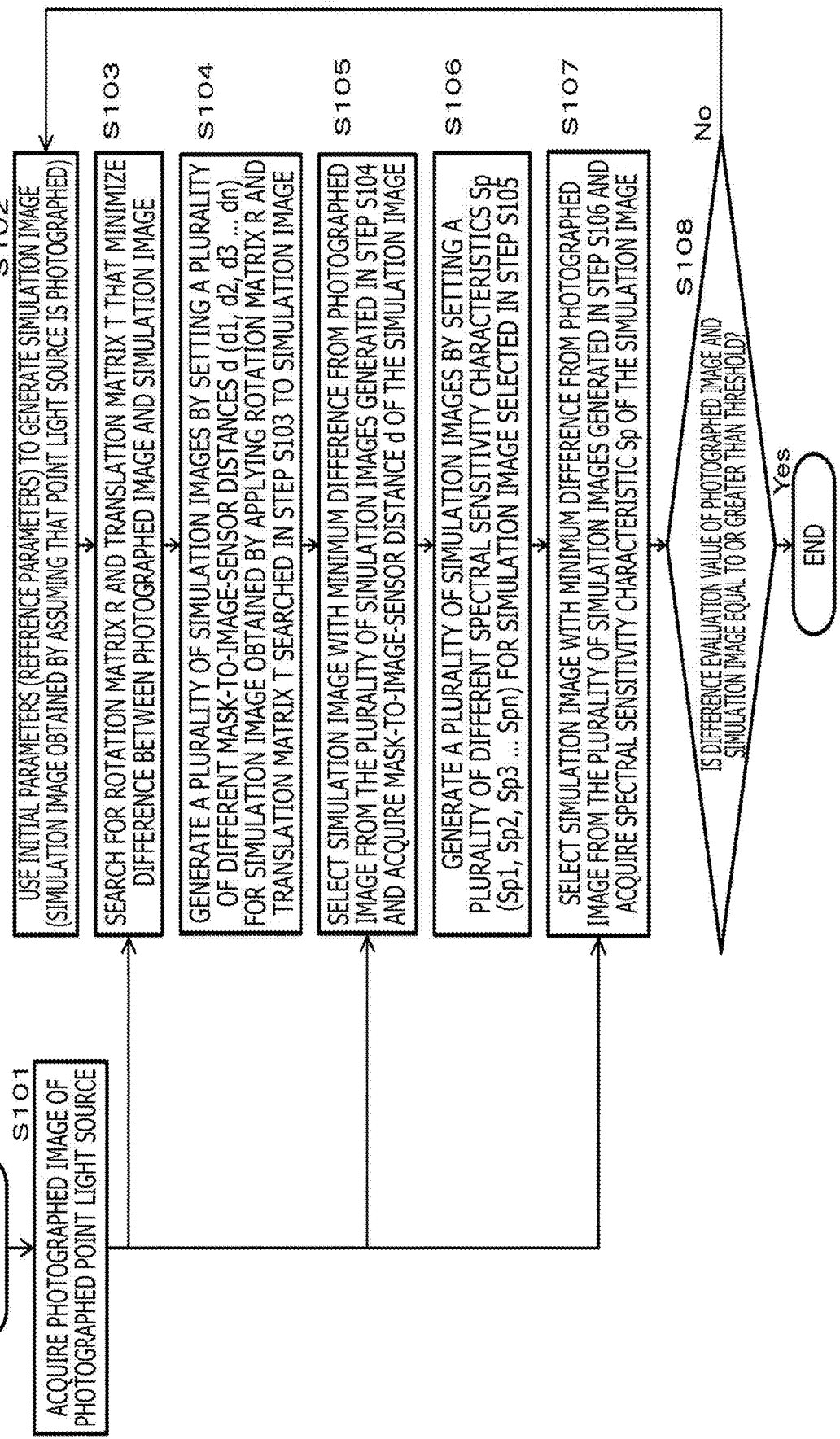
FIG. 12 is a diagram illustrating a flow chart describing a processing sequence of the calibration process of the present disclosure.

In a case where the process is finished after executing the process of steps S102 to S107 in the flow illustrated in FIG. 12 once, that is, in a case where the value of the difference evaluation function SSIM is equal to or greater than the predefined threshold in step S108, the following amount of correction provides data correction parameters) indicating the deviation from the reference parameters of the lensless camera as a current target of calibration or indicating the characteristics.

(1) Rotation parameter R=2.36°,
(2) Translation parameter T=−0.000086 m, −0.000101 m,
(3) Mask-to-image-sensor distance parameter d=2.38 mm
(4) Spectral sensitivity characteristic Sp of image sensor= (0.6, 0.65, 0.75, 0.65, 0.59)

For example, the data (correction parameters) is stored in a memory of the lensless camera to be calibrated. In generating the restored image for the photographed image, the lensless camera can use the data (correction parameters) stored in the memory to calculate the imaging matrix F to thereby calculate an optimal imaging matrix F corresponding to the actual configuration of the camera.

Note that the actual configuration of the camera is, for example, configuration information including (a) the positional relation Mp of the mask with respect to the sensor and (b) the spectral sensitivity characteristic Sp of the image sensor.

Note that as described above in (Equation 3), the matrix constituent elements F(j) of the imaging matrix F of the corresponding row of the pixel j in the image sensor are defined by the following (Equation 3).

$$F(j)=G(x,y,z,Xp,Mg,Mp,Sp,j) \quad \text{(Equation 3)}$$

The parameters geometrical position Mp of the mask with respect to the sensor and the spectral sensitivity characteristic Sp of the image sensor included in the equation are stored in the memory of each camera as parameters corresponding to the configuration and the characteristics unique to each camera calculated according to the flow illustrated in FIG. 12.

In generating the restored image for the photographed image, the lensless camera can use the data (correction parameters) stored in the memory to calculate the imaging matrix F to thereby calculate an optimal imaging matrix F corresponding to the actual configuration of the camera.

Note that the parameters (Mp, Sp) unique to each camera may be used in advance to calculate a corrected imaging matrix F corresponding to the camera, and the corrected imaging matrix F may be stored in the memory.

Alternatively, an imaging matrix F common to the cameras may be stored, and a correction matrix for transforming the common imaging matrix F into an imaging matrix F unique to camera reflecting the parameters (Mp, Sp) unique to each camera may be calculated. The correction matrix may be stored in the memory of each camera.

Note that as described above, the correspondence between the observed value y of the image sensor of the lensless camera and the imaging matrix F is represented by the following (Equation 1).

$$y=Fx+n \quad \text{(Equation 1)}$$

where y: image sensor observed value,

F: imaging matrix, x: scene vector (sampling point synchrotron radiation (=restored image)), and n: noise.

In the case of calculating the pixel value of the restored image from the image sensor observed value y, an inverse matrix $F^{-1}$ of the imaging matrix F is used.

Therefore, the inverse matrix $F^{-1}$ of the imaging matrix F reflecting the parameters unique to each camera may be stored in advance in the memory of each camera.

[5. Configuration Example of Apparatus that Executes Calibration Process and Camera]

Next, a configuration example of an apparatus that executes the calibration process and a camera will be described.

Figure 14:
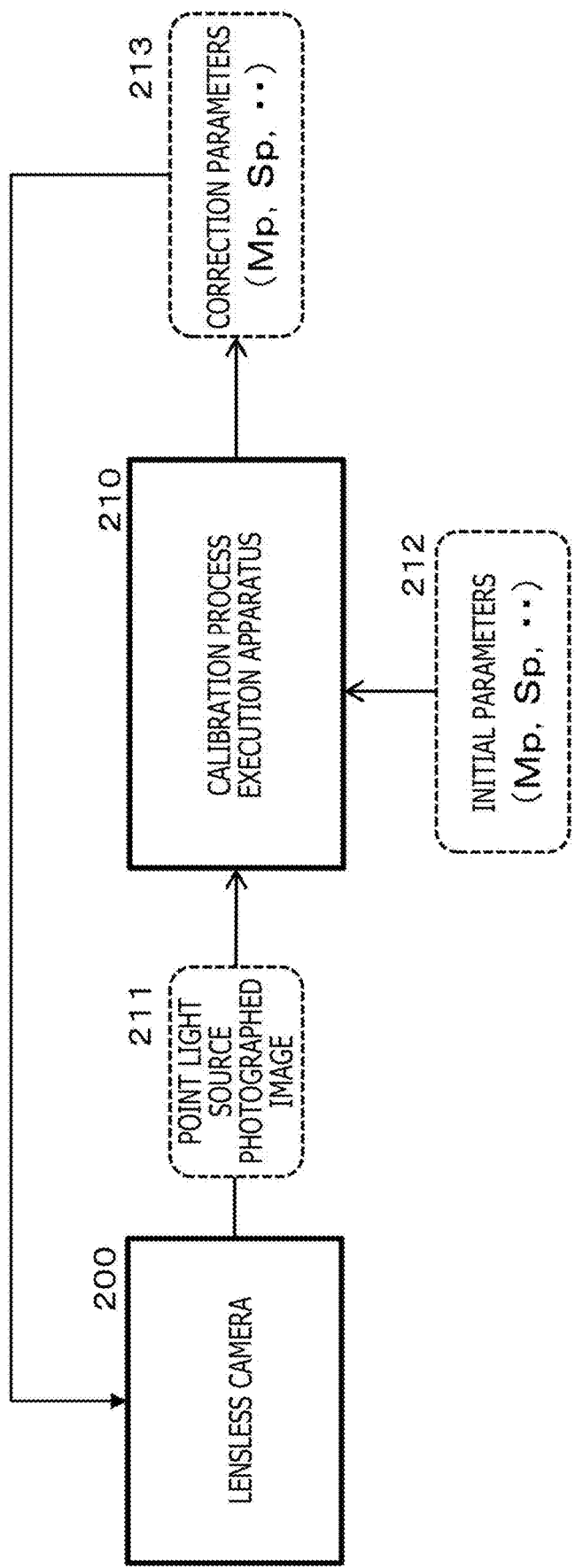
FIG. 14 is a diagram describing an example of an apparatus configuration for executing the calibration process of the present disclosure.

FIG. 14 is a block diagram illustrating an apparatus configuration example of the case of executing the process according to the flow illustrated in FIG. 12. A lensless camera 200 to be calibrated and a calibration process execution apparatus 210 are connected. The lensless camera 200 includes a mask and an image sensor, and the image sensor receives light through the mask.

As described above with reference to FIG. 9, the lensless camera 200 outputs a point light source photographed image 211 obtained by photographing a point light source to the calibration apparatus 210.

The calibration apparatus 210 executes the process of steps S102 to S108 in the flow chart described above with reference to FIG. 12. That is, the calibration apparatus 210 first generates a simulation image (reference image) assumed to be photographed in the case where a reference lensless camera with ideal configuration and settings is used to photograph the point light source by applying initial parameters (reference parameters) 212.

Subsequently, the calibration apparatus 210 sequentially corrects the simulation image to reduce the difference between the generated simulation image and the point light source photographed image 211 input from the lensless camera 200.

In the correction process of the simulation image, the calibration apparatus 210 first sequentially changes the values rotation parameter R and translation parameter T to generate simulation images (corrected reference images).

The calibration apparatus 210 selects a simulation image closest to the point light source photographed image 211 from the simulation images (corrected reference images) and holds the rotation parameter R and the translation parameter T applied to the selected simulation image (corrected reference image).

Next, the calibration apparatus 210 generates simulation images (corrected reference images) in which the value of the mask-to-image-sensor distance parameter d is sequentially changed. The calibration apparatus 210 selects a simulation image closest to the point light source photographed image 211 from the simulation images (corrected reference images) and holds the mask-to-image-sensor distance parameter d applied to the selected simulation image.

Furthermore, the calibration apparatus 210 optionally generates simulation images (corrected reference images) in which the spectral sensitivity characteristic Sp of the image sensor is sequentially changed. The calibration apparatus 210 selects a simulation image closest to the point light source photographed image 211 from the simulation images (corrected reference images) and holds the spectral sensitivity characteristic Sp applied to the selected simulation image.

The calibration apparatus 210 repeats the process until the SSIM indicating the difference between the point light source photographed image 211 and the simulation image (corrected reference image) is equal to or greater than the defined threshold. The calibration apparatus 210 ends the process once the SSIM indicating the difference between the point light source photographed image 211 and the simulation image (corrected reference image) becomes equal to or greater than the defined threshold. The calibration apparatus 210 outputs the correction parameters obtained at this point and stores the correction parameters in, for example, a memory of the lensless camera 200.

The correction parameters to be output are the parameters indicating (a) the positional relation Mp of the mask with respect to the sensor, the parameters including the rotation parameter R, the translation parameter T, and the mask-to-image-sensor distance parameter d.

Furthermore, in the case where the sensitivity characteristic Sp of the image sensor is also calculated, this parameter is also output.

FIG. 15 is a block diagram illustrating a configuration example of the lensless camera 200. The lensless camera 200 includes an imaging unit 201, a signal processing unit 202, and a memory 203. As described above with reference to FIG. 4 and the like, a mask is arranged in front of an image sensor in the imaging unit 201. The mask is a mask in which transmission regions and non-transmission regions of light are set as a two-dimensional pattern. The light through the mask is input to the image sensor.

An observed image 231 imaged by the image sensor of the imaging unit 201 is input to the signal processing unit 202. The signal processing unit 202 applies signal processing to the observed image 231 and outputs a restored image 232. The restored image (final image) 232 is an image including a subject of a photographed scene as in a normal camera provided with camera.

The signal processing unit 202 executes a process using the imaging matrix F in the signal processing of generating the restored image 232 from the observed image 231. Specifically, the signal processing unit 202 executes a process of, for example, multiplying the inverse matrix $F^{-1}$ of the imaging matrix F by the observed image 231 to generate the restored image 232.

Here, a unique matrix generated by using the parameters unique to the lensless camera 200 is used for the imaging matrix F. That is, the parameters (a) positional relation Mp of the mask with respect to the sensor and (b) spectral sensitivity characteristic Sp of the image sensor are parameters unique to camera. The imaging matrix F unique to camera generated by applying the unique parameters and the inverse matrix $F^{-1}$ can be used to generate a correct restored image 232.

For example, one of the following data is stored in the memory 203.

(1) A common imaging matrix F and correction parameters (Mp, SP, . . . ) unique to camera, (2) a common imaging matrix F and a correction matrix reflecting the correction parameters (Mp, SP, . . . ) unique to camera, (3) an imaging matrix F unique to camera generated by applying the correction parameters (Mp, SP, . . . ) unique to camera, and (4) an inverse matrix $F^{-1}$ corresponding to the imaging matrix F unique to camera generated by applying the correction parameters (Mp, SP, . . . ) unique to camera are examples of the stored data.

Note that (2) the correction matrix reflecting the correction parameters (Mp, SP, . . . ) unique to camera is a matrix that allows to apply a multiplication process to the common imaging matrix F to transform the common imaging matrix F into the imaging matrix F unique to camera generated by applying the correction parameters (Mp, SP, . . . ) unique to camera.

The signal processing unit 202 uses the data stored in the memory 203 and generates the restored image 232 by applying the unique matrix generated based on the parameters unique to the lensless camera 200. According to the process, a correct image restoration process corresponding to the configuration and the characteristics unique to camera can be executed, and a correct restored image 232 can be generated.

[6. Processing Example of Simplified Calculation Process]

The calibration process for providing the imaging matrix F corresponding to the configuration and the settings unique to the lensless camera has been described so far. Patent Literature 1 (International Publication No. WO2016/123529) described above discloses a configuration of simplifying the calculation process for generating the restored image by executing a process of replacing the imaging matrix with two one-dimensional vectors (Separable model generation). Furthermore, the simplification of the calculation process is also realized in the calibration process for correcting the imaging matrix F.

In the process of the present disclosure, the imaging matrix F can also be replaced with two one-dimensional vectors to execute the process. That is, a Separable model can be generated to execute the calibration process.

As described above, the photographing principle of the observed image photographed by the lensless camera can be formularized and expressed by the following (Equation 1).

$$y = Fx + n \quad \text{(Equation 1)}$$

where y: observed signal of image sensor (one-dimensional data)

x: scene vector (value (one-dimensional data) of synchrotron radiation of photographed scene)

n: noise

F: imaging matrix

As described above with reference to FIGS. 6A, 6B, 6C, and 6D, (Equation 1) can be represented by a matrix operation formula.

Assuming that

Y: matrix of observed signals y of image sensor,

F: imaging matrix, and

X: matrix of scene vectors x, each matrix is represented by the following (Equation 11).

[Math. 1]

$$Y = \begin{pmatrix} y_{11} \\ y_{12} \\ \vdots \\ y_{1N} \\ y_{21} \\ y_{22} \\ \vdots \\ y_{2N} \\ \vdots \\ y_{MN} \end{pmatrix}, \quad F = \begin{pmatrix} f_{1,1} & f_{1,2} & \cdots & f_{1,KL} \\ f_{2,1} & f_{2,2} & \cdots & f_{2,KL} \\ \vdots & \ddots & & \vdots \\ f_{MN,1} & f_{MN,2} & \cdots & f_{MN,KL} \end{pmatrix}, \quad \text{(Equation 11)}$$

$$X = \begin{pmatrix} x_{11} \\ x_{12} \\ \vdots \\ x_{1L} \\ x_{21} \\ x_{22} \\ \vdots \\ x_{2L} \\ \vdots \\ x_{KL} \end{pmatrix}$$

Note that it is assumed that the number of pixels of the image sensor is MN, and the number of sampling points of the photographed scene (=the number of pixels of the restored image) is KL.

To simplify the description, the noise n is deleted, and the following (Equation 4) is applied in the process described below.

$$Y = FX \quad \text{(Equation 4)}$$

A pixel value $y_{ij}$ of column i, row j of the image sensor of the lensless camera can be expressed by the following (Equation 12).

[Math. 2]

$$y_{ij} = (f_{N(i-1)+j,1} \; f_{N(i-1)+j,2} \; \cdots \; f_{N(i-1)+j,K}) \begin{pmatrix} x_{11} \\ x_{12} \\ \vdots \\ x_{1L} \\ x_{21} \\ x_{22} \\ \vdots \\ x_{2L} \\ \vdots \\ x_{KL} \end{pmatrix} = \quad \text{(Equation 12)}$$

$$\sum_{r=1}^{KL} f_{N(i-1)+j,r} x_{((r-1)divL)+1,((r-1)modL)+1}$$

Here, when the process of replacing the imaging matrix F in (Equation 4) with two one-dimensional vectors (Separable model generation) is executed, (Equation 4) can be represented by the following (Equation 13).

[Math. 3]

$$Y^* = \Phi_L X^* \Phi_R^T \quad \text{(Equation 13)}$$

In (Equation 13), $\Phi_L$ and $\Phi_R^T$ are matrices generated in the process of replacing the imaging matrix F with two one-dimensional vectors (Separable model generation). When (Equation 13) is represented by a determinant, the following (Equation 14) is obtained.

[Math. 4]

$$\begin{pmatrix} y_{11} & y_{12} & \cdots & y_{1N} \\ y_{21} & y_{22} & \cdots & y_{2N} \\ \vdots & \ddots & & \vdots \\ y_{M1} & y_{M2} & \cdots & y_{MN} \end{pmatrix} = \begin{pmatrix} g_{11} & g_{12} & \cdots & g_{1K} \\ g_{21} & g_{22} & \cdots & g_{2K} \\ \vdots & \ddots & & \vdots \\ g_{MI} & g_{M2} & \cdots & g_{MK} \end{pmatrix} \quad \text{(Equation 14)}$$

-continued $$\begin{pmatrix} x_{11} & x_{12} & \dots & x_{1L} \\ x_{21} & x_{22} & \dots & x_{2L} \\ \vdots & \ddots & & \vdots \\ x_{K1} & x_{K2} & \dots & x_{KL} \end{pmatrix} \begin{pmatrix} h_{11} & h_{12} & \dots & h_{1N} \\ h_{21} & h_{22} & \dots & h_{2N} \\ \vdots & \ddots & & \vdots \\ h_{L1} & h_{L2} & \dots & h_{LN} \end{pmatrix}$$

Furthermore, when (Equation 14) is transformed, the following (Equation 15) is derived.

[Math. 5]

$$\begin{pmatrix} x_{11} & x_{12} & \dots & x_{1L} \\ x_{21} & x_{22} & \dots & x_{2L} \\ \vdots & \ddots & & \vdots \\ x_{K1} & x_{K2} & \dots & x_{KL} \end{pmatrix} \begin{pmatrix} h_{11} & h_{12} & \dots & h_{1N} \\ h_{21} & h_{22} & \dots & h_{2N} \\ \vdots & \ddots & & \vdots \\ h_{L1} & h_{L2} & \dots & h_{LN} \end{pmatrix} = \begin{pmatrix} \sum_{p=1}^{L} x_{1p} h_{p1} & \sum_{p=1}^{L} x_{1p} h_{p2} & \dots & \sum_{p=1}^{L} x_{1p} h_{pN} \\ \sum_{p=1}^{L} x_{2p} h_{p1} & \sum_{p=1}^{L} x_{2p} h_{p2} & \dots & \sum_{p=1}^{L} x_{2p} h_{pN} \\ \vdots & \vdots & & \vdots \\ \sum_{p=1}^{L} x_{Kp} h_{p1} & \sum_{p=1}^{L} x_{Kp} h_{p2} & \dots & \sum_{p=1}^{L} x_{Kp} h_{pN} \end{pmatrix}$$

(Equation 15)

Furthermore, based on (Equation 15), the pixel value of the pixel value $y_{ij}$ of column i, row j of the image sensor can be expressed by the following (Equation 16).

[Math. 6]

$$y_{ij} = (g_{i1} g_{i2} \dots g_{iK}) \begin{pmatrix} \sum_{p=1}^{L} x_{1p} h_{pj} \\ \sum_{p=1}^{L} x_{2p} h_{pj} \\ \vdots \\ \sum_{p=1}^{L} x_{Kp} h_{pj} \end{pmatrix} = \sum_{q=1}^{K} g_{iq} \sum_{p=1}^{L} x_{qp} h_{pj} = \sum_{q=1}^{K} \sum_{p=1}^{L} g_{iq} h_{pj} x_{qp}$$

(Equation 16)

(Equation 16) and (Equation 12) are equations expressing the same pixel value of the pixel value $y_{ij}$ of column i, row j of the image sensor, and therefore, the following (Equation 17) is established.

[Math. 7]

$$\sum_{q=1}^{K} \sum_{p=1}^{L} g_{iq} h_{pj} x_{qp} = \sum_{r=1}^{KL} f_{N(i-1)+j,r} x_{((r-1)divL)+1,((r-1)modL)+1}$$

(Equation 17)

where $(i, j)$, $1 \le i \le M$, $1 \le j \le N$

Note that as described above, to map the elements (coefficients) of the corrected imaging matrix F after calibration corrected based on the parameters Mp and Sp (a) positional relation Mp of the mask with respect to the sensor (b) spectral sensitivity characteristic Sp of image sensor, which are configuration information of each lensless camera, on the model matrices $\Phi_L$ and $\Phi_R^T$ generated in the process of replacing the matrix with two one-dimensional vectors (Separable model generation) and on the coefficients of the model matrices, some scenes X can be assumed to create simultaneous equations.

For example, variables (a, b, c, d) are set under conditions as illustrated in the following (Equation 18).

[Math. 8]

For each $(a, b, c, d)$, (Equation 18)

$1 \le a \le M$, $1 \le b \le K$, $1 \le c \le L$, $1 \le d \le N$, $$X = \{x_{ij}\} = \begin{cases} 1, & \text{if } i = b \text{ and } j = c \\ 0, & \text{otherwise} \end{cases}$$

When the variables (a, b, c, d) are set under the conditions as illustrated in (Equation 18), a pixel value $y_{a,d}$ on the image sensor can be expressed by the following (Equation 19) by assigning a) for the right side of (Equation 17) and assigning b) for the left side.

[Math. 9]

$$a) \sum_{q=1}^{K} \sum_{p=1}^{L} g_{aq} h_{pd} x_{qp} = g_{ab} h_{cd}$$

(Equation 19)

$$b) \sum_{r=1}^{KL} f_{N(a-1)+d,r} x_{((r-1)divL)+1,((r-1)modL)+1} = f_{N(a-1)+d,L(b-1)+c}$$

where $\varphi$ $x_{((r-1)divL)+L((r-1)modL)+1} = 1$ $iff [((r-1)divL) + 1 = b \text{ and} ((r-1)modL) + 1 = c] \Rightarrow$ $r = L(b-1) + c$ A relational expression of the following (Equation 20) can be eventually derived based on (Equation 19), and a corresponding coefficient indicating the pixel value on the image sensor can be provided according to (Equation 20).

[Math. 10]

$g_{a,b} h_{c,d} = f_{N(a-1)+d,L(b-1)+c}$ (Equation 20)

In this way, the imaging matrix F can be transformed into the model matrices $\Phi_L$ and $\Phi_R^T$ generated in the process of replacing the imaging matrix F with two one-dimensional vectors (Separable model generation). As a result, the simplified process of the calculation process as described in Patent Literature 1, specifically, the calculation process of the corrected imaging matrix F suitable for the parameters unique to camera, can be executed.

[7. Other Embodiments and Advantageous Effects of Image Processing of Present Disclosure]

Next, other embodiments and advantageous effects of the image processing of the present disclosure will be described. The process according to the flow illustrated in FIG. 12 can be executed by, for example, a calibration apparatus in a manufacturing plant of lensless cameras, and information obtained as a result of the calibration process is stored in the memory of each camera.

For example, as described with reference to FIG. 15, one of the following data is stored in the memory of each lensless camera.

(1) A common imaging matrix F and correction parameters (Mp, SP, . . . ) unique to camera, (2) a common imaging matrix F and a correction matrix reflecting the correction parameters (Mp, SP, . . . ) unique to camera, (3) an imaging matrix F unique to camera generated by applying the correction parameters (Mp, SP, . . . ) unique to camera, and (4) an inverse matrix $F^{-1}$ corresponding to the imaging matrix F unique to camera generated by applying the correction parameters (Mp, SP, . . . ) unique to camera are examples of the stored data.

The lensless camera can use the data stored in the memory to execute a correct image restoration process corresponding to the configuration and the characteristics unique to the lensless camera.

The process according to the flow illustrated in FIG. 12 may be executed not only by the calibration apparatus in the manufacturing plant of lensless cameras, but also by, for example, a server that can communication with the lensless camera. In addition, the data to be applied to the restored image generation process reflecting the configuration and the characteristic information unique to each lensless camera, that is, the data of (1) to (5), may be stored in a memory of a server, and the lensless camera may acquire the data from the server as necessary.

Next, advantageous effects of the configuration and the process of the present disclosure will be described. According to the configuration of the present disclosure, the lensless camera executes the photographing process of the point light source once (or the process can be executed for a plurality of times by changing the distance), and the photographed image and the simulation image are compared. In this way, the imaging matrix G reflecting the geometrical and positional relation between the mask and the sensor in a most excellent manner, the correction matrix of the imaging matrix G, the correction parameters unique to camera, or the like can be acquired.

By applying the process of the present disclosure, the photographing time that is a bottleneck in the camera calibration process can be significantly reduced, and the lensless camera can also be corrected for light other than visible light in a wavelength region that is hard (or expensive) to install in the display.

Furthermore, according to the process of the present disclosure, the same imaging data can be used not only for the geometrical positional relation between the mask and the sensor that is data unique to each camera, but also for, for example, the spectral sensitivity characteristics of the sensor. In this way, the optimal imaging matrix G adapted to the spectral sensitivity characteristics corresponding to each camera, the correction matrix of the imaging matrix G, the correction parameters unique to camera, or the like can be acquired.

[8. Hardware Configuration Example of Image Processing Apparatus]

Next, a hardware configuration example of an image processing apparatus will be described with reference to FIG. 16.

Hardware described with reference to FIG. 16 is a configuration example of the calibration process execution apparatus (calibration process execution apparatus 210 illustrated in FIG. 14) that executes the calibration process described above with reference to FIG. 12. The hardware is also an example of a hardware configuration for executing the process of the signal processing unit 202 in the lensless camera 200 illustrated in FIG. 15.

A CPU (Central Processing Unit) 501 functions as a control unit or a data processing unit that executes various processes according to programs stored in a ROM (Read Only Memory) 502 or a storage unit 508. For example, the CPU 501 executes the processes according to the sequences described in the embodiments. The programs executed by the CPU 501, the data, and the like are stored in the RAM (Random Access Memory) 503. The CPU 501, the ROM 502, and the RAM 503 are connected to each other through a bus 504.

The CPU 501 is connected to an input-output interface 505 through the bus 504, and an input unit 506 including various switches, a keyboard, a mouse, a microphone, a sensor, and the like and an output unit 507 including a display, a speaker, and the like are connected to the input-output interface 505. The CPU 501 executes various processes according to instructions input from the input unit 506 and outputs processing results to, for example, the output unit 507.

The storage unit 508 connected to the input-output interface 505 includes, for example, a hard disk or the like and stores the programs executed by the CPU 501 and various data. The communication unit 509 functions as a transmission-reception unit of Wi-Fi communication, Bluetooth (registered trademark) (BT) communication, and other data communications through networks, such as the Internet and a local area network, and communicates with external apparatuses.

A drive 510 connected to the input-output interface 505 drives a removable medium 511, such as a magnetic disk, an optical disk, a magneto-optical disk, a memory card, and other semiconductor memories, and records or reads data.

[9. Conclusion of Configuration of Present Disclosure]

The embodiments of the present disclosure have been described in detail with reference to specific embodiments. However, it is apparent that those skilled in the art can modify or substitute the embodiments without departing from the scope of the present disclosure. That is, the present invention has been disclosed in a form of an example, and the present invention should not be restrictively interpreted. The section of the claims should be taken into account to determine the scope of the present disclosure.

Note that the technique disclosed in the present specification can be configured as follows.

(1) An image processing apparatus including a signal processing unit that receives a photographed image as an output of an image sensor of a lensless camera to generate a restored image, in which the signal processing unit executes image processing using data unique to camera generated based on at least positional relation information of a mask and the image sensor of the lensless camera to generate the restored image.

(2) The image processing apparatus according to (1), in which the data unique to camera includes data generated in a comparison process of a photographed image, which is obtained by photographing one point light source in a forward direction of an optical axis of the lensless camera, and a reference image.

(3) The image processing apparatus according to (2), in which the reference image includes a simulation image estimated to be acquired by photographing one point light source in the forward direction of the optical axis of the lensless camera in a case where a positional relation between the mask and the image sensor of the lensless camera indicates reference positions.

(4) The image processing apparatus according to (3), in which the simulation image includes a simulation image generated by applying a diffraction simulation model of the mask.

(5) The image processing apparatus according to (3) or (4), in which the data unique to camera includes data detected by applying a correction process to the simulation image and generating a simulation image in which a difference from the photographed image is small.

(6) The image processing apparatus according to any one of (1) to (5), in which the data unique to camera includes positional relation data Mp of the mask of the lensless camera with respect to the image sensor.

(7) The image processing apparatus according to (6), in which the positional relation data Mp includes three parameters including a rotation parameter R of the mask with respect to the image sensor, a translation parameter T of the mask with respect to the image sensor, and a distance parameter d between an image sensor center and a mask center.

(8) The image processing apparatus according to any one of (1) to (7), in which the data unique to camera includes data including (a) positional relation data Mp of the mask of the lensless camera with respect to the image sensor, and (b) spectral sensitivity characteristic data Sp of the image sensor.

(9) The image processing apparatus according to any one of (1) to (8), in which the signal processing unit executes image processing using an imaging matrix F common to a plurality of lensless cameras and the data unique to camera to generate the restored image.

(10) The image processing apparatus according to any one of (1) to (9), in which the signal processing unit executes image processing using an imaging matrix F unique to camera corrected by applying the data unique to camera to generate the restored image.

(11) The image processing apparatus according to any one of (1) to (10), in which the signal processing unit generates the restored image based on a relation between an imaging matrix F unique to camera, which is corrected by applying the data unique to camera, and an observed value y of the image sensor.

(12) The image processing apparatus according to any one of (1) to (11), in which the data unique to camera includes data generated in a comparison process of a photographed image, which is obtained by photographing one point light source in a forward direction of an optical axis of the lensless camera, and a reference image, and data unique to camera, an imaging matrix F, or a correction matrix corresponding to a plurality of different subject distances acquired in a process using a photographed image corresponding to distance, which is obtained by changing the distance between the lensless camera and the point light source, and a simulation image.

(13) An image processing apparatus that executes a calibration process of receiving a photographed image obtained by photographing one point light source in a forward direction of an optical axis of a lensless camera and a simulation image estimated to be acquired by photographing one point light source in the forward direction of the optical axis of the lensless camera in a case where a positional relation between a mask and an image sensor of the lensless camera indicates reference positions, applying a correction process to the simulation image, selecting a corrected simulation image in which a difference from the photographed image is small, and generating data unique to camera that can be applied to an image restoration process in the lensless camera based on corrected data applied to the corrected simulation image.

(14) The image processing apparatus according to (13), in which the data unique to camera includes positional relation data of the mask of the lensless camera with respect to the image sensor.

(15) The image processing apparatus according to (13) or (14), in which the data unique to camera includes data including (a) positional relation data Mp of the mask of the lensless camera with respect to the image sensor, and (b) spectral sensitivity characteristic data Sp of the image sensor.

(16) The image processing apparatus according to any one of (13) to (15), in which the image processing apparatus executes a process using a photographed image corresponding to distance, which is obtained by changing the distance between the lensless camera and the point light source, and a simulation image to generate data unique to camera, an imaging matrix F, or a correction matrix corresponding to different subject distances.

(17) An imaging apparatus including: an imaging unit including a mask provided with transmission regions and non-transmission regions of light set as a two-dimensional pattern and an image sensor that receives light through the mask; a memory storing data unique to camera generated in a comparison process of a photographed image, which is obtained by photographing one point light source in a forward direction of an optical axis of the imaging unit, and a reference image; and a signal processing unit that receives a photographed image as an output of the image sensor to generate a restored image. The signal processing unit executes image processing using the data unique to camera stored in the memory to generate the restored image.

(18) An image processing method executed by an image processing apparatus, in which the image processing apparatus includes a signal processing unit that receives a photographed image as an output of an image sensor of a lensless camera to generate a restored image, and the signal processing unit executes image processing using data unique to camera generated based on at least positional relation information between a mask and the image sensor of the lensless camera to generate the restored image.

(19) An image processing method of executing a calibration process of a lensless camera executed by an image processing apparatus. The image processing apparatus receives a photographed image obtained by photographing one point light source in a forward direction of an optical axis of a lensless camera and a simulation image estimated to be acquired by photographing one point light source in the forward direction of the optical axis of the lensless camera in a case where a positional relation between a mask and an image sensor of the lensless camera indicates reference positions, applies a correction process to the simulation image, selects a corrected simulation image in which a difference from the photographed image is small, and generates data unique to camera that can be applied to an image restoration process in the lensless camera based on corrected data applied to the corrected simulation image.

In addition, the series of processes described in the specification can be executed by hardware, software, or a composite configuration of the hardware and the software.

In the case where the software executes the processes, the processes can be executed by installing the programs recording the processing sequences on a memory in a computer incorporated into dedicated hardware or can be executed by installing the programs on a general-purpose computer that can execute various processes. For example, the programs can be recorded in advance in a recording medium. Other than installing the programs on the computer from the recording medium, the programs can be received through a network, such as a LAN (Local Area Network) and the Internet, and installed on a recording medium, such as a built-in hard disk.

Note that various processes described in the present specification may be executed not only in chronological order according to the description, but may also be executed in parallel or individually according to the processing capacity of the apparatus that executes the processes or as necessary. In addition, the system in the present specification is a logical set configuration of a plurality of apparatuses, and the apparatuses of each configuration may not be in the same housing.

INDUSTRIAL APPLICABILITY

As described above, according to the configuration of an embodiment of the present disclosure, a configuration is realized that can execute image processing reflecting data unique to camera, such as positional relation information of a mask and an image sensor of a lensless camera, to generate a highly accurate restored image.

REFERENCE SIGNS LIST

80 Lensless camera
81 Image sensor
82 Mask
83 Signal processing unit
90 Photographed scene
91 Sampling point
101 Image sensor observed value y
102 Imaging matrix F
103 Sampling point synchrotron radiation x
104 Noise
110 Photographed scene
111 Target point A
120 Lensless camera
121 Mask
122 Image sensor
200 Lensless camera
201 Imaging unit
202 Signal processing unit
203 Memory
210 Calibration apparatus
501 CPU
502 ROM
503 RAM
504 Bus
505 Input-output interface
506 Input unit
507 Output unit
508 Storage unit
509 Communication unit
510 Drive
511 Removable medium

The invention claimed is:

1. An image processing apparatus, comprising:
a signal processing unit configured to:
receive a first photographed image as an output from an image sensor of a lensless camera;
execute image processing based on data unique to the lensless camera, wherein
the data unique to the lensless camera is based on a comparison of a second photographed image and a simulation image,
the second photographed image corresponds to a photograph of a point light source,
the point light source is in a forward direction of an optical axis of the lensless camera,
the simulation image corresponds to a photograph of the point light source at a reference position, and
the reference position indicates a positional relation between a mask of the lensless camera and the image sensor; and
generate a restored image based on the image processing.

2. The image processing apparatus according to claim 1, wherein the simulation image is based on a diffraction simulation model of the mask.

3. The image processing apparatus according to claim 1, wherein
the data unique to the lensless camera includes a corrected simulation image,
the corrected simulation image is based on a correction process applied to the simulation image, and
a difference between the corrected simulation image and the second photographed image is small.

4. The image processing apparatus according to claim 1, wherein the data unique to the lensless camera includes positional relation data Mp of the mask with respect to the image sensor.

5. The image processing apparatus according to claim 4, wherein
the positional relation data Mp includes:
a rotation parameter R of the mask with respect to the image sensor;
a translation parameter T of the mask with respect to the image sensor; and
a distance parameter d between an image sensor center and a mask center.

6. The image processing apparatus according to claim 1, wherein
the data unique to the lensless camera includes:
positional relation data Mp of the mask with respect to the image sensor; and
spectral sensitivity characteristic data Sp of the image sensor.

7. The image processing apparatus according to claim 1, wherein
the signal processing unit is further configured to execute the image processing based on an imaging matrix F and the data unique to the lensless camera, and
the imaging matrix F is common to a plurality of lensless cameras that includes the lensless camera.

8. The image processing apparatus according to claim 1, wherein
the signal processing unit is further configured to execute the image processing based on an imaging matrix F unique to the lensless camera, and
the imaging matrix F unique to the lensless camera is corrected based on the data unique to the lensless camera.

9. The image processing apparatus according to claim 1, wherein the signal processing unit is further configured to generate the restored image based on a relation between an imaging matrix F unique to the lensless camera and an observed value y of the image sensor.

10. The image processing apparatus according to claim 1, wherein
the data unique to the lensless camera further includes one of an imaging matrix F or a correction matrix corresponding to a plurality of different subject distances,
the imaging matrix and the correction matrix are based on a change in a distance associated with the second photographed image and the simulation image, and
the change in the distance is based on a distance between the lensless camera and the point light source.

11. An image processing apparatus, comprising:
circuitry configured to:
receive a photographed image of a point light source, wherein the point light source is in a forward direction of an optical axis of a lensless camera;
estimate a simulation image, wherein
the simulation image corresponds to a photograph of the point light source at a reference position,
the reference position indicates a positional relation between a mask of the lensless camera and an image sensor of the lensless camera;
apply a correction process to the simulation image;
select a corrected simulation image in which a difference from the photographed image is small; and
generate data unique to the lensless camera for an image restoration process in the lensless camera, wherein the data unique to the lensless camera is based on corrected data applied to the corrected simulation image.

12. The image processing apparatus according to claim 11, wherein the data unique to the lensless camera includes positional relation data Mp of the mask with respect to the image sensor.

13. The image processing apparatus according to claim 11, wherein
the data unique to the lensless camera includes:
positional relation data Mp of the mask with respect to the image sensor; and
spectral sensitivity characteristic data Sp of the image sensor.

14. The image processing apparatus according to claim 11, wherein
the image processing apparatus is further configured to:
execute a process based on a change in a distance associated with the photographed image and the simulation image; and
generate one of an imaging matrix F or a correction matrix corresponding to a plurality of different subject distances; and
the change in the distance is based on a distance between the lensless camera and the point light source.

15. An imaging apparatus, comprising:
an imaging unit that includes:
a mask in a two-dimensional pattern of transmission regions and non-transmission regions of light; and
an image sensor configured to:
receive light through the mask;
output a first photographed image; and
output a second photographed image, wherein
the second photographed image corresponds to a photograph of a point light source, and
the point light source is in a forward direction of an optical axis of the imaging unit;
a memory configured to store data unique to camera, wherein
the data is based on a comparison of the second photographed image and a simulation image,
the simulation image corresponds to a photograph of the point light source at a reference position, and
the reference position indicates a positional relation between the mask and the image sensor; and
a signal processing unit configured to:
receive the first photographed image from the image sensor;
execute image processing based on the data unique to camera stored in the memory; and
generate a restored image based on the image processing.

16. An image processing method, comprising:
in an image processing apparatus that includes a signal processing unit:
receiving a first photographed image as an output from an image sensor of a lensless camera;
executing image processing based on data unique to the lensless camera, wherein
the data unique to the lensless camera is based on a comparison of a second photographed image and a simulation image,
the second photographed image corresponds to a photograph of a point light source,
the point light source is in a forward direction of an optical axis of the lensless camera,
the simulation image corresponds to a photograph of the point light source at a reference position, and
the reference position indicates a positional relation information between a mask of the lensless camera and the image sensor; and
generating a restored image based on the image processing.

17. An image processing method, comprising:
in an image processing apparatus:
executing a calibration process of a lensless camera by:
receiving a photographed image of a point light source, wherein the point light source is in a forward direction of an optical axis of the lensless camera;
estimating a simulation image, wherein
the simulation image corresponds to a photograph of the point light source at a reference position,
the reference position indicates a positional relation between a mask of the lensless camera and an image sensor of the lensless camera;
applying a correction process to the simulation image;
selecting a corrected simulation image based on in which a difference from the photographed image is small; and
generating data unique to the lensless camera for an image restoration process in the lensless camera, wherein the data unique to the lensless camera is based on corrected data applied to the corrected simulation image.

18. An image processing apparatus, comprising:
a signal processing unit configured to:
receive a first photographed image as an output from an image sensor of a lensless camera;

execute image processing based on data unique to the lensless camera, wherein
the data unique to the lensless camera includes:
a data based on a comparison of a second photographed image and a simulation image, wherein
the second photographed image corresponds to a photograph of a point light source, and
the point light source is in a forward direction of an optical axis of the lensless camera, and
one of an imaging matrix F or a correction matrix corresponding to a plurality of different subject distances, wherein
the imaging matrix and the correction matrix are based on a change in a distance associated with the second photographed image and the simulation image, and
the change in the distance is based on a distance between the lensless camera and the point light source; and
generate a restored image based on the image processing.

* * * * *